United States Patent [19]

Wataya et al.

[11] Patent Number: 4,887,095

[45] Date of Patent: Dec. 12, 1989

[54] IMAGE RECORDING APPARATUS USING SEVERAL TYPES OF ENERGY AND RECORDING PROCESS

[75] Inventors: Masafumi Wataya, Tokyo; Yukio Sato, Kawasaki; Yoshihiro Ishida, Kawasaki; Tadashi Yamamoto, Kawasaki, all of Japan

[73] Assignee: Canon Kabushiki Kaisha, Tokyo, Japan

[21] Appl. No.: 27,219

[22] Filed: Mar. 17, 1987

[30] Foreign Application Priority Data

| | | | |
|---|---|---|---|
| Mar. 20, 1986 | [JP] | Japan | 61-060634 |
| Apr. 25, 1986 | [JP] | Japan | 61-094592 |
| May 16, 1986 | [JP] | Japan | 61-110862 |
| Jun. 28, 1986 | [JP] | Japan | 61-150677 |

[51] Int. Cl.[4] .......... G01D 15/10

[52] U.S. Cl. .......... 346/76 PH; 346/1.1; 600/120

[58] Field of Search .......... 346/1.1, 76 PH, 76 R; 600/120

[56] References Cited

U.S. PATENT DOCUMENTS

| | | | |
|---|---|---|---|
| 3,944,356 | 3/1976 | Hayne | 355/3 R |
| 4,255,042 | 3/1981 | Armitage | 355/3 R |

FOREIGN PATENT DOCUMENTS

| | | | |
|---|---|---|---|
| 0205083 | 12/1986 | European Pat. Off. | 400/120 |
| 0051357 | 3/1986 | Japan | 346/76 PH |
| 2113860 | 11/1985 | United Kingdom . | |

*Primary Examiner*—H. Broome
*Assistant Examiner*—Huan H. Tran
*Attorney, Agent, or Firm*—Fitzpatrick, Cella, Harper & Scinto

[57] ABSTRACT

An image recording apparatus for recording an image on a recording medium by employing a transfer recording medium having a transfer recording layer whose transfer characteristics change upon application of heat energy and light energy thereto comprises: a recording section including a thermal head for applying heat energy to the transfer recording medium disposed along a conveying route of the transfer recording medium and a light source for applying light energy to the transfer recording medium; a transfer section for transferring onto the recording medium an image formed on the transfer recording medium in the recording section; and a device disposed upstream of the transfer section in the advancing direction of the transfer recording medium and adapted to make portions of the transfer recording layer other than an image-forming area non-transferrable.

32 Claims, 23 Drawing Sheets

IMAGE RECORDING APPARATUS USING SEVERAL TYPES OF ENERGY AND RECORDING PROCESS

BACKGROUND OF THE INVENTION

1. Field of the Invention

The present invention relates to a method of and apparatus for image recording applicable to printers, copying machines, electronic typewriters, facsimile equipment, and the like.

2. Related Background Art

In recent years, various kinds of information processing system have been developed in conjunction with rapid progress made in the information industry, and recording apparatuses suitable for the various information processing systems have been developed.

Among such recording apparatuses, there is a thermal transfer recording apparatus. This apparatus effects recording on recording paper using an ink ribbon in which a heat melting ink having a coloring agent dispersed in a heat melting binder is applied to a substrate.

In other words, the ink ribbon is superposed on recording paper in such a manner that a thermal transfer ink layer will contact the recording paper, and the ink ribbon and the recording paper are conveyed between a thermal head and a platen. Then, by applying heat in the form of pulses corresponding to image signals sent from the substrate side of the ink ribbon by means of the thermal head and by using pressure to transfer the melted ink onto the recording paper, an ink image corresponding to heating and the pressurization is recorded on the recording paper.

The above-described apparatus is compact, light in weight, and noise-free, and recording paper can be effected on plain paper.

However, such conventional thermal transfer recording apparatuses are not free from problems.

In other words, with conventional thermal transfer recording apparatuses, the transfer recording performance, i.e., the printing quality, is substantially affected by the smoothness of the surface of the recording medium. Although good image recording is effected on recording paper with a high degree of surface smoothness, in the case of recording paper with a low degree of surface smoothness there is a possibility of a reduction in the quality of images recorded.

In addition, if a multi-color image is to be obtained using a conventional thermal transfer recording apparatus, it is necessary to repeat the transfer process to cause different colors to overlap each other. For that reason, it becomes necessary to provide a plurality of thermal heads or provide the recording paper with complicated functions such as stopping and reverse feeding. Thus, there are problems in that color drift is unavoidable, and that the overall apparatus becomes large and complex.

Therefore, the present applicant invented image recording methods and transfer recording media which allow high-quality images to be recorded on a recording medium having a low degree of surface smoothness by overcoming the aforementioned problems of the prior art. In addition, the present applicant invented image recording methods and transfer recording media which allow multi-color images to be obtained without needing to have the recording medium perform complicated functions. The present applicant filed patent applications in Japan for these inventions as Japanese Patent Application Nos. 120080/1985 (filed on June 3, 1985), 120081/1985 (filed on June 3, 1985), 131411/1985 (filed on June 17, 1985), 134831/1985 (filed on June 20, 1985), 150597/1985 (filed on June 7, 1985), 199926/1985 (filed on Sept. 10, 1985), and 250884/1985 (filed on Nov. 11, 1985). Furthermore, on the basis of the priority rights afforded by these Japanese applications, the present applicant filed an application in the United States (U.S. Ser. No. 869,689, filed on June 2, 1986) and a European application (Application No. 86107540.6, filed on June 3, 1986).

The present invention which will be described below is a further development of the aforementioned inventions for which the present applicant filed the Japanese applications, the U.S. application, and the European application. The present invention can be applied, as necessary, to the image recording methods and transfer recording media described in the specifications of the aforementioned applications.

SUMMARY OF THE INVENTION

Accordingly, a primary object of the present invention is to provide a method of and apparatus for image recording in which a transfer recording layer will not be transferred unnecessarily.

Another object of the present invention is to provide a method of and an apparatus for image recording in which a transfer recording layer will not be adhered to unnecessary portions.

Still another object of the present invention is to provide a method of and apparatus for image recording which is capable of obtaining clear images without offsetting.

A further object of the present invention is to provide a method of and an apparatus for image recording which is capable of forming high-quality images on a recording medium with a low degree of surface smoothness (e.g., plain paper with a rough surface).

A still further object of the present invention is to provide a method of and apparatus for image recording which is capable of recording at high speed.

A further object of the present invention is to provide a method of and apparatus for image recording which is capable of obtaining multi- or full-color recorded images without the need to have a transfer recording medium or a recording medium perform complicated functions.

A yet further object of the present invention is to provide a method of and apparatus for image recording which is capable of effecting in separate processes the formation of images on a transfer recording medium and the transfer of the images onto a recording medium.

These and other objects and features of the present invention will become apparent from the following detailed description of the invention when read in conjunction with the accompanying drawings.

DESCRIPTION OF THE PREFERRED EMBODIMENTS

Figure 1:
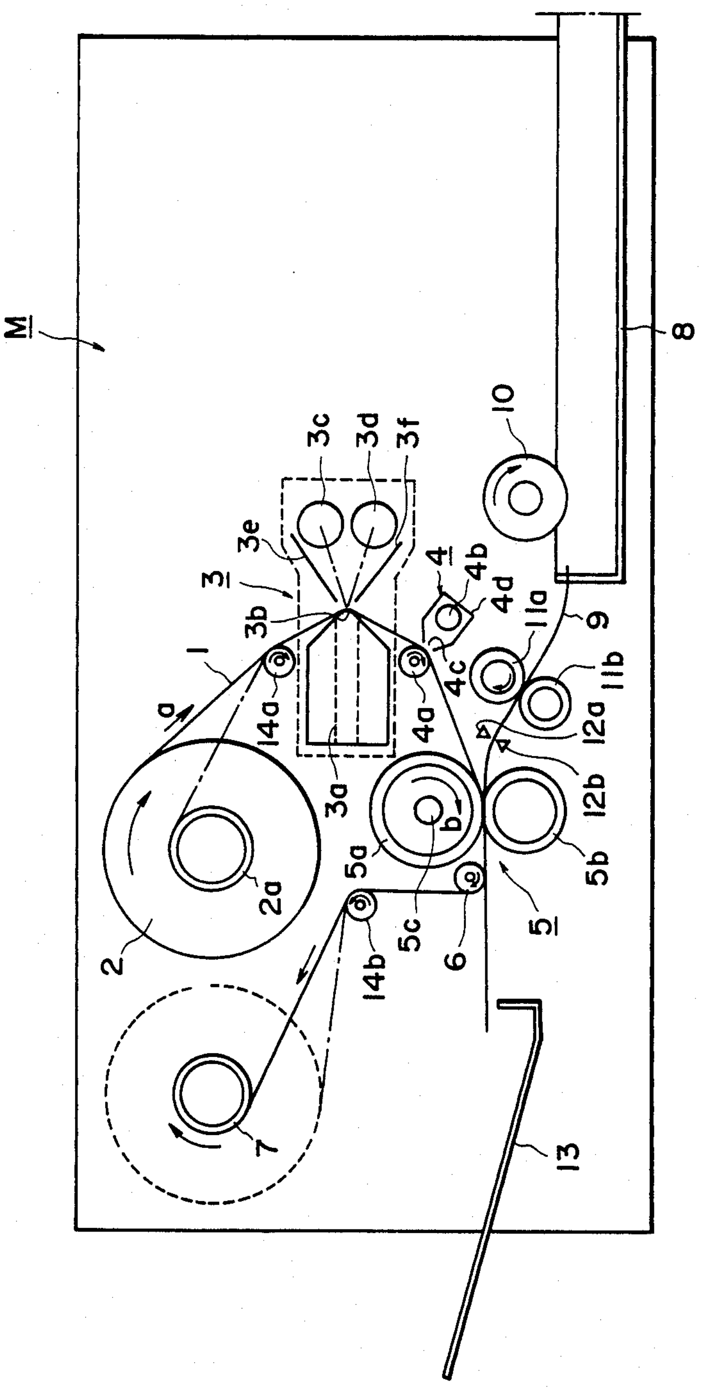
FIG. 1 is an overall schematic drawing of an embodiment of the present invention.

Referring now to the accompanying drawings, description will be made of embodiments of an image recording apparatus in accordance with the present invention. As mentioned before, it goes without saying that the embodiments of the present invention can, as necessary, be applied to the image recording methods and transfer recording media described in the specifications of the aforementioned applications.

In an image recording apparatus in accordance with the present invention, a transferred image is formed by varying the physical properties governing the transfer characteristics. These physical properties are determined as required, in accordance with the kinds of transfer recording media used. For instance, in the case of a transfer recording medium in which transfer is effected after rendering a transfer image in a thermally melted state, the physical properties are determined by the melting temperature, the softening temperature, or the glass transfer point. In the case of a transfer recording medium in which transfer is effected after rendering a transfer image in an adhesive state or in a state in which it is capable of permeating a recording medium, the physical properties are determined by the viscosity at an identical temperature. In addition, a plurality of kinds of energy used for forming a transfer image can also be determined as required. For instance, optoelectronic beams, heat, pressure, or the like may be used in a suitable combination.

A first embodiment which will be described below is aimed at providing a recording apparatus in which, at the time of transferring an image onto the recording medium by superposing on the recording medium the transfer recording medium with a transferred image formed thereon, even if a portion where the recording medium does not overlap, i.e., wherein the transfer recording layer of the transfer recording medium is exposed and is in contact with a transfer member, such as a pressure roller, the transfer recording layer will not adhere to that member.

As means to that end, there is provided an image recording apparatus for recording an image on a recording medium by employing a transfer recording medium having a transfer recording layer whose transfer characteristics change upon application of a first energy and a second energy thereto, comprising: a recording section including first energy applying means for applying the first energy to the transfer recording medium disposed along a conveying route of the transfer recording medium and second energy applying means for applying the second energy to the transfer recording medium; a transfer section for transferring onto the recording medium an image formed on the transfer recording medium in the recording section; and means disposed upstream of the transfer section in the advancing direction of the transfer recording medium adapted to make portions of the transfer recording layer other than an image-forming area non-transferrable.

In accordance with the above-described means, if recording is effected by setting the transfer recording medium and the recording medium in the apparatus, predetermined heat and light energy is applied to the transfer recording medium in the recording section to form an image, and the image is transferred onto the recording medium in the transfer section.

In addition, as for the portion of the transfer recording medium outside the image-forming area, energy is applied to that portion by the nontransfer means before being conveyed to the transfer section, so that the portion is thereby made to have non-transfer characteristics. Therefore, even if that portion comes into contact with a member of the transfer section, the transfer recording layer is not adhered to that member.

Next, description will be made of an embodiment of the present invention to which the above-described means are applied.

FIG. 1 is a schematic diagram of a recording apparatus.

In the drawing, an elongated sheet-like transfer recording medium 1 is wound up in the shape of a roll and is detachably incorporated in the main body M of the apparatus as a supply roll 2. In other words, this supply roll 2 is mounted detachably on a rotatable shaft 2*a* provided in the main body M of the apparatus.

First, the tip of this transfer recording medium 1 is guided along a guide roller 14*a*, a recording head 3*a*, a heat roller 4*a*, and then is led between a transfer 5*a* and a pressure roller 5*b*, is redirected by a release roller 6 and a guide roller 14*b*, is led to a takeup roll 7 where it is retained by a retaining means such as a gripper (not shown). Subsequently, by rotating the takeup roll 7 by a known driving means, the transfer recording medium 1 is paid out in the direction of the arrow a and is consecutively wound up around the peripheral surface of the takeup roll 7.

Incidentally, at the time of the winding-up operation, the supply roll 2 is given a fixed back tension by means of, for instance, a hysteresis brake (not shown), and the arrangement is such that the transfer recording medium 1 is conveyed while being held in pressure contact with a recording head 3*a* with a constant pressure and at a predetermined angle therewith by means of this tension and the guide roller 14*a* and the heat roller 4*a*.

The arrangement of each of the aforementioned parts will now be described individually.

Figure 2:
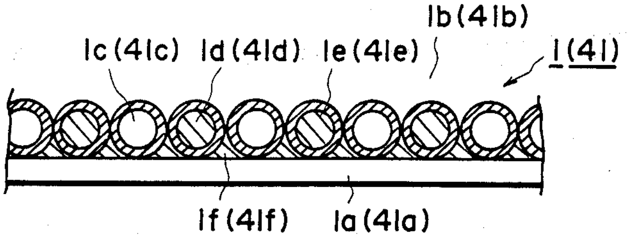
FIG. 2 is a schematic diagram illustrating a transfer recording medium.

The transfer recording medium 1 is arranged such that a transfer recording layer 1*b* having properties capable of forming a latent image in cases where both heat and light energy are applied thereto is adhered to a sheet-like substrate 1*a*, as shown in FIG. 2.

For instance, as shown in FIG. 2, the transfer recording layer 1*b* is constituted by microcapsule-like image-forming elements formed by the following method using the components shown in Tables 1 and 2 as cores 1*c*, 1*d*.

In other words, 10 g of components shown in Tables 1 and 2 are mixed with 20 wt. % of methylene chloride, and this mixture is then mixed with 200 ml of water in which 1 g of gelatine and a cationic or nonionic surface active agent having an HLB value of at least 10 or above are dissolved. This mixture is agitated by a homomixer held at a temperature of 60° C. at a speed of 8000–10,000 r.p.m. to emulsify the same, thereby obtaining oily droplets having an average particle diameter of 26 μm.

Furthermore, the mixture is further agitated for 30 minutes at 60° C., and the average particle diameter is reduced to approximately 10 μm by removing methylene chloride. 20 ml of water in which 1 g of gum arabic is dissolved is added to the same. Subsequently, aqueous $NH_4OH$ (ammonium) is added to the mixture while cooling it gradually to set the pH to 11 or above, and a microcapsule slurry is thereby obtained. The walls of the microcapsules are hardened by gradually adding 1.0 ml of a 20% aqueous solution of glutaraldehyde to the same.

Subsequently, the microcapsule slurry is separated into a solid and a liquid using a Nutsche funnel, and the solid is then dried by a vacuum cleaner for 10 hours at 35° C., thereby obtaining microcapsule-like image-forming elements.

These image-forming elements are microcapsules in which the components 1*c*, 1*d* of Tables 1 and 2 are respectively covered with shells 1*e*, and are formed into a particle size of 7–15 μm and an average particle size of 10 μm.

The image-forming elements thus formed are adhered on the substrate la constituted by a 6 μm-thick polyethylene terephthalate film, using an adhesive material lf obtained by adding several droplets of a surface active agent to a 5% aqueous solution of PVA per 100 cc, thereby forming the transfer recording layer 1*b*. Thus the transfer recording medium 1 is arranged.

TABLE 1

| Item | Component | wt. % |
|---|---|---|
| Polymerizable prepolymer | $(CH_2{=}CHCOOCH_2.CH_2.O.CO.$ 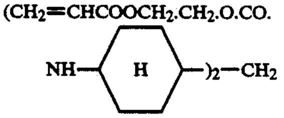  | 70 |
| Reaction initiator | Irgacure-907 (mfd. by Ciba-Geigy Corp.) | 11 |
| Binder | Elvasite 2041 (mfd. by Du Pont) | 17 |
| Colorant | Diaresin Red K (mfd. by Mitsubishi Chemical Industries, Ltd.) | 2 |

TABLE 2

| Item | Component | wt. % |
|---|---|---|
| Polymerizable prepolymer | $(CH_2{=}CHCOOCH_2.CH_2.O.CO.$ 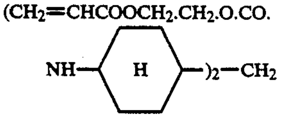  | 75 |
| Reaction initiator | 2-chlorothioxanthone/ethyl-P—dimethyl-amino-benzoate | 1.5/3 |
| Binder | Elvasite 2041 (mfd. by Du Pont) | 18.5 |
| Colorant | Diaresin Blue K. (mfd. by Mitsubishi Chemical Industries, Ltd.) | 2 |

Figure 3:
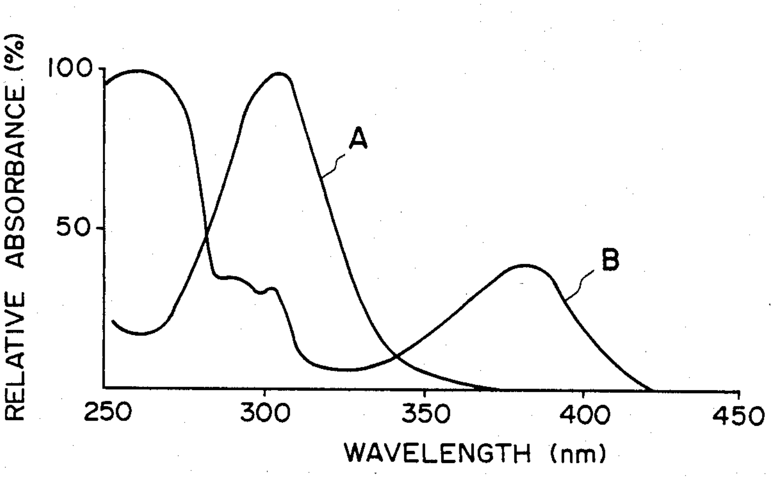
FIG. 3 is a diagram illustrating the spectroscopic characteristics of a reaction initiator in the transfer recording medium.

The reaction initiator shown in Table 1 above starts reaction by absorbing light in the range of Curve A in the spectroscopic characteristics of FIG. 3 and assumes a color of red at the time of image formation. Meanwhile, the reaction initiator shown in Table 2 starts reaction by absorbing light in the range of Curve B in the spectroscopic characteristics of FIG. 3 and assumes a color of blue at the time of image formation.

Next, description will be made of the recording section 3, which is comprised of a heating means and an irradiating means.

The heating means is arranged such that an array of 8-dot/mm, A-4 size (209 mm×297 mm) heating elements 3*b* of the line type each having a width of 0.2 mm and adapted to generate heat in response to image signals are disposed on the surface of the recording head 3*a*. The arrangement is such that the substrate 1*a* side of the transfer recording medium 1 is held in pressure contact with the array of heating elements 3*b* with a predetermined pressure by means of back tension as the transfer recording medium 1 is conveyed. Incidentally, the image signals are issued from a below-described control section of such as facsimile equipment, an image scanner, or an electronic blackboard.

Figure 4:
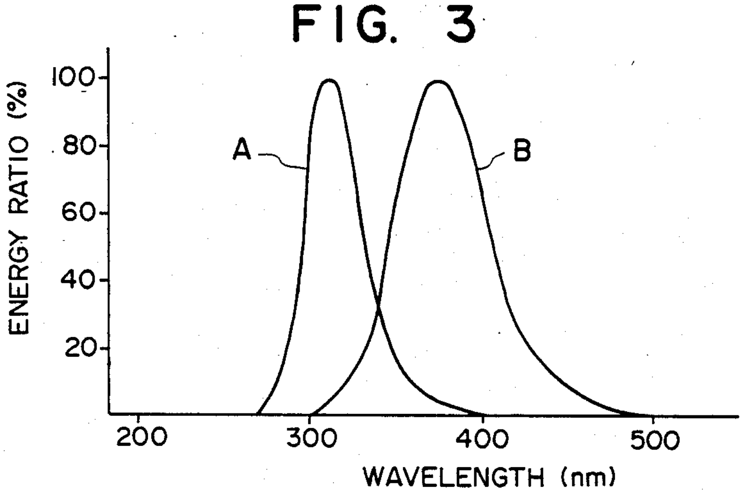
FIG. 4 is a diagram illustrating the spectroscopic characteristics of a light source.

Meanwhile, two 20-Watt fluorescent tubes 3*c*, 3*d*, i.e., an irradiating means, having the spectroscopic characteristics as shown in FIG. 4 are disposed on the side of the transfer recording layer 1*b* opposing the recording head 3*a* such as to be about 25 mm apart rom the transfer recording medium 1.

Furthermore, slit plates 3e, 3f are arranged in such a manner that an about 0.5 mm clearance is maintained between these slit plates 3e, 3f and the transfer recording medium 1, while the width of their opening is set at 1.2 mm, so that direct rays from the fluorescent tubes 3c, 3d will be applied only to the area of the transfer recording medium 1 which in pressure contact with the recording head 3a immediately above the array of heating elements.

Incidentally, in this embodiment, as the fluorescent tube 3c having the spectroscopic characteristics of Curve A in FIG. 4, a 20-Watt health-ray fluorescent tube FL20SE made by Toshiba Corporation is used, while as the other fluorescent tube 3d having the spectroscopic characteristics of Curve B a 20-Watt copy-use fluorescent tube FL20BA-37 made by Matsushita Electric Corporation is used.

Next, description will be made of the non-transfer means 4. The non-transfer means 4 is disposed downstream of the recording section 3 in the advancing direction of the transfer recording medium 1, and a heat roller 4a for coming into contact with the substrate la side of the transfer recording medium 1 and adapted to heat the same uniformly and a light source 4b for applying light to the ink layer 1b side thereof are disposed such as to face each other. A light-shielding plate 4d having a 3 mm-wide slit 4c is disposed between the light source 4b and the transfer recording medium 1, thereby allowing the light of the light source 4b to pass through the slit 4c and preventing the same from being applied to the portion of the transfer recording medium other than that in contact with the heat roller 4a.

Incidentally, the light of the light source 4b has a wavelength for reacting both the reaction initiators listed in Tables 1 and 2, and is arranged such that it will flash in correspondence with the conveyance of the transfer recording medium 1 by means of signals from a control section which will be described below.

The transfer section 5 will now be described. The transfer section 5 is disposed downstream of the non-transfer means 4 in the advancing direction of the transfer recording medium, and is comprised of the transfer roller 5a rotatively driven in the direction of the arrow b as shown in FIG. 1 and the pressure roller 5b in pressure contact with the transfer roller 5a. The transfer roller 5a is constituted by an aluminum roller with its surface coated with 1 mm-thick silicone rubber having a hardness of 70 degrees, and is so arranged that its surface temperature will be held at 90°-100° C. by a 800 W halogen heater 5c.

Meanwhile, the pressure roller 5b is constituted by an aluminum roller with its surface coated with 1 mm-thick silicone rubber having a hardness of 70 degrees, and its pressing force against the transfer roller 5a is set to 6-7 kgf/cm by means of a pressurizing means (not shown) such as a spring.

Furthermore, recording paper 9, i.e., the recording medium, is stacked in a cassette 8, and is conveyed by a feed roller 10 and a pair of registration rollers 11a, 11b, as shown in FIG. 1, as a feed motor $M_1$ is driven in correspondence with the conveyance of the transfer recording medium 1. At that time, the tip of the recording paper 9 is detected by registration sensors constituted by a light-emitting device 12a and a light-receiving device 12b, and the arrangement is such that the recording paper 9 is conveyed by being synchronously controlled in such a manner that the recording paper 9 is superposed on an image-forming portion of the transfer recording medium 1.

Description will be made hereafter of the operation in cases where recording is effected by the recording apparatus having the above-described arrangement.

If the transfer recording medium 1 is paid out consecutively from the supply roll 2 by driving the motor $M_2$, an image is formed if light and heat are imparted to the transfer recording layer 1b of the transfer recording medium 1 in correspondence with image signals in the recording section 3.

Incidentally, in the embodiment which will be described below, an example is shown in which heat is applied in correspondence to image signals and light is applied uniformly.

In other words, the transfer recording layer 1b has a characteristic that, if heat and light of a predetermined wavelength are applied thereto, its softening temperature rises and the transfer is not effected onto the recording paper 9. Therefore, as shown in the timing chart of FIG. 5, at the time or red color recording (magenta image recording), heating elements corresponding to image signals representing red in the array of heating elements 3b in which a plurality of heating elements are arranged are not energized, and portions corresponding to image signals representing white (the recording medium 9 is assumed to be white) are energized for 25 m.sec. Those portions are uniformly irradiated with the light of the fluorescent tube 3c with a time lag of 5 m.sec. At this juncture, the irradiation time is set to 45 m.sec.

Then, at the time of effecting blue color recording, after a lapse of 50 m.sec. upon completion of the irradiation, i.e., in 100 m.sec. from the time of starting energization, heating elements corresponding to image signals representing blue in the array of heating elements 3b are not energized, and those portions corresponding to image signals representing white are energized for 25 m.sec. and are then irradiated uniformly with the light of the fluorescent tube 3d with a time lag of 5 m.sec. The irradiation time at this juncture is 45 m.sec. as in the above.

A negative latent image is formed on the transfer recording layer 1b by controlling the recording head 3a in correspondence with the image signals representing red, blue, and white in the procedure as described below. The transfer recording medium 1 as conveyed in synchronization with a repeated cycle of 200 m.sec./-line.

Furthermore, the transfer recording medium 1 on which an image has been formed as described above as processed in such a manner that, when the transfer recording medium 1 has passed the non-transfer means 4, portions of the transfer recording layer 1b other than the aforementioned image-forming area become non-transferrable.

Figure 6:
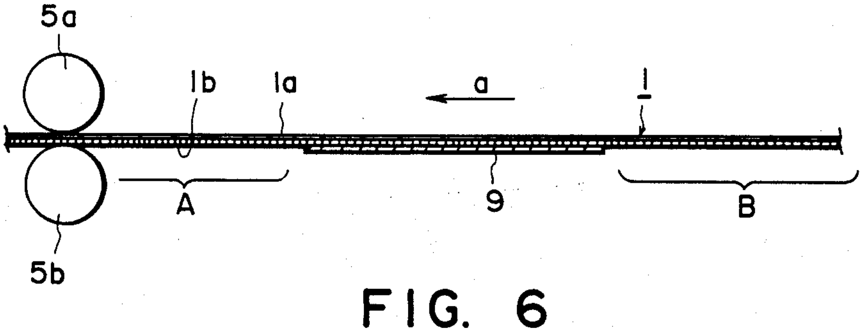
FIG. 6 is a diagram illustrating a state in which a sheet of recording medium is superposed on a transfer recording medium.

The aforementioned treatment process will be described by an example in which, for instance, a sheet of the recording paper 9 is conveyed to effect recording. As shown in FIG. 6, the transfer recording layer 1b of the transfer recording medium 1 is exposed in portions other than the image-forming area, namely, in the portion A downstream of the tip of the recording paper 9 in the advancing direction of the transfer recording medium and in the portion B upstream of the rear end of the recording paper 9 (in cases where a plurality of cut sheets of the recording paper 9 by cut sheets are conveyed continuously, portions of very small gaps created between the sheets are also exposed).

When the exposed portions A and B pass the position of the slit 4c of the non-transfer means 4, the light source 4b is lit to impart light energy, while heat energy is imparted from the side of the substrate 1a by the heat roller 4a. Accordingly, the portions A and B of the transfer recording layer 1b become non-transferrable since their softening temperature increases.

The flashing timing of the light source 4b will be described more specifically by citing an example of recording by conveying a sheet of the recording paper 9 of the A-4 size (209 mm×297 mm), for example.

Figure 7:
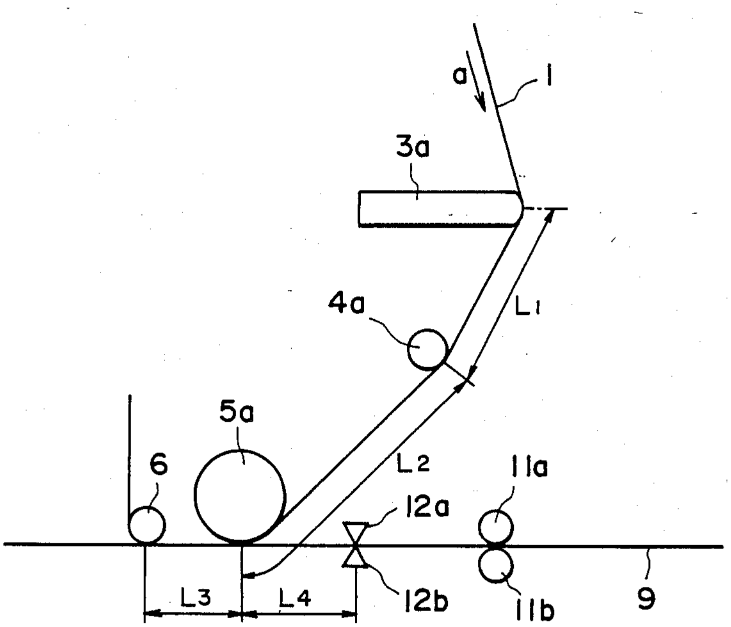
FIG. 7 is an explanatory diagram illustrating the distance from each member in a recording apparatus.
Figure 8:
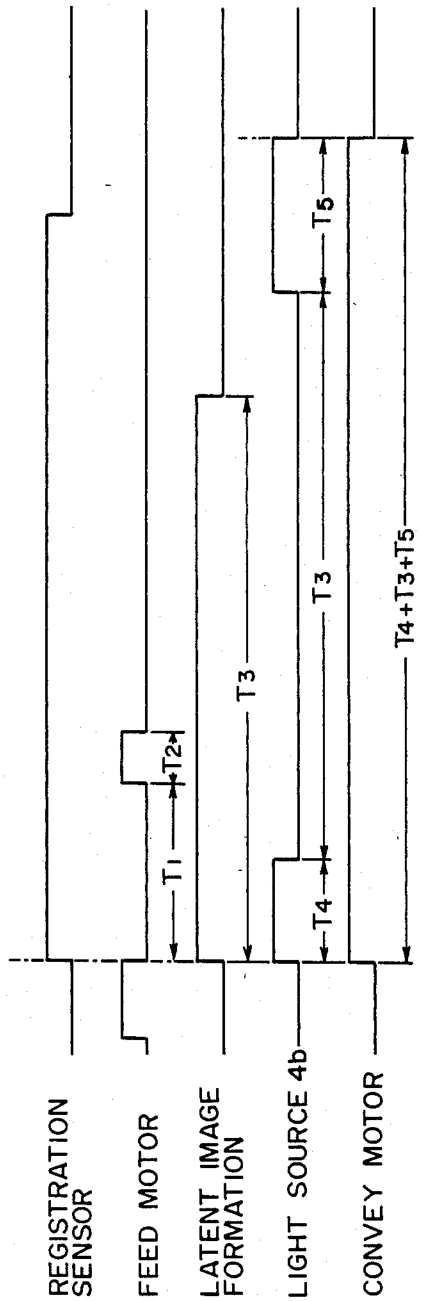
FIG. 8 is a timing chart illustrating relationships between irradiation with light by a non-transfer means and the conveyance of the transfer recording medium and the according medium.

As shown in FIG. 7, if it is assumed that the distance from the recording head 3a to the heat roller 4a is $L_1$, the distance from the heat roller 4a to the position of pressure contact between the transfer roller 5a and the pinch roller 5b is $L_2$, the distance from the position of pressure contact to the release roller 6 is $L_3$, and the distance from the position of pressure contact to the registration sensors 12a, 12b is $L_4$, a feed motor for rotating the feed roller 10 and the pair of registration rollers 11a, 11b on pressing of a start button is driven, as shown in the timing chart in FIG. 8, and the drive is stopped when the tip of the recording paper is detected by the registration sensors 12a, 12b. At the same time, the convey motor $M_2$ for rotating the transfer roller 5a is driven to convey the transfer recording medium 1 in the direction of the arrow a, and the recording section 3 is operated during a time T (i.e., the duration or time during which the transfer recording medium 1 is conveyed the length of 297 mm), thereby forming an image corresponding to the length of the A-4 size.

At this juncture, the light source 4b is lit until the tip of the image reaches the position of the heat roller 4a, i.e., during a time $T_4$ when the transfer recording medium 1 is conveyed the distance of L. Subsequently, the light source 4b is turned off during the time $T_3$ during which the image-forming area passes the position of the heat roller 4a. The light source 4b is lit again simultaneously as the rear end of the image-forming area passes the position of the neat roller 4a, and light is applied until the rear end of the image-forming area reaches the position of the release roller 6, i.e., during a time T5 during which the transfer recording medium 1 is conveyed the distance $L_2$ plus $L_3$.

Incidentally, when a time $T_1$ lapses during which the transfer recording medium 1 is conveyed the distance $L_1+L_2-L_4$ from the starting of conveyance, the feed motor $M_1$ is driven during a time $T_2$ (i.e., the duration of time during which the recording paper 9 is conveyed the distance $L_4$) to convey the recording paper 9 at the same speed as that of the transfer recording medium 1, and then stops. As a result, the tip or the recording paper 9 is aligned with and superposed in the tip of the image of the transfer recording medium 1 in the transfer section 5, and the recording paper 9 after superposition is conveyed by the rotation of the transfer roller 5a.

As described above, the transfer recording layer 1b other than the image-forming area is made non-transferrable by applying light energy with the controlled flashing of the light source 4b and by applying heat energy from the heat roller 4a. The transfer recording medium 1 and the recording paper 9 are superposed on each other in the transfer section 5, and both of them are subjected to heating and pressure contact, thereby transferring the image formed on the transfer recording medium 1 onto the recording paper 9.

The transferred image of the two colors of red and black- is recorded on the recording paper 9, as described above, and, since the portions of the transfer recording layer 1b that are exposed are non-transferrable, even if those portions are brought into contact with the pressure roller 5b, the transfer recording layer 1b is not adhered to the roller 5b.

Subsequently the recording paper 9 on which the image has been transferred is released from the transfer recording medium 1 by means of the release roller 6, and is discharged onto a discharge tray 13.

As described above, it becomes possible to effect two-color recording in one pass without causing the transfer recording layer to be attached to the pressure roller 5b and the like.

Figure 9A:
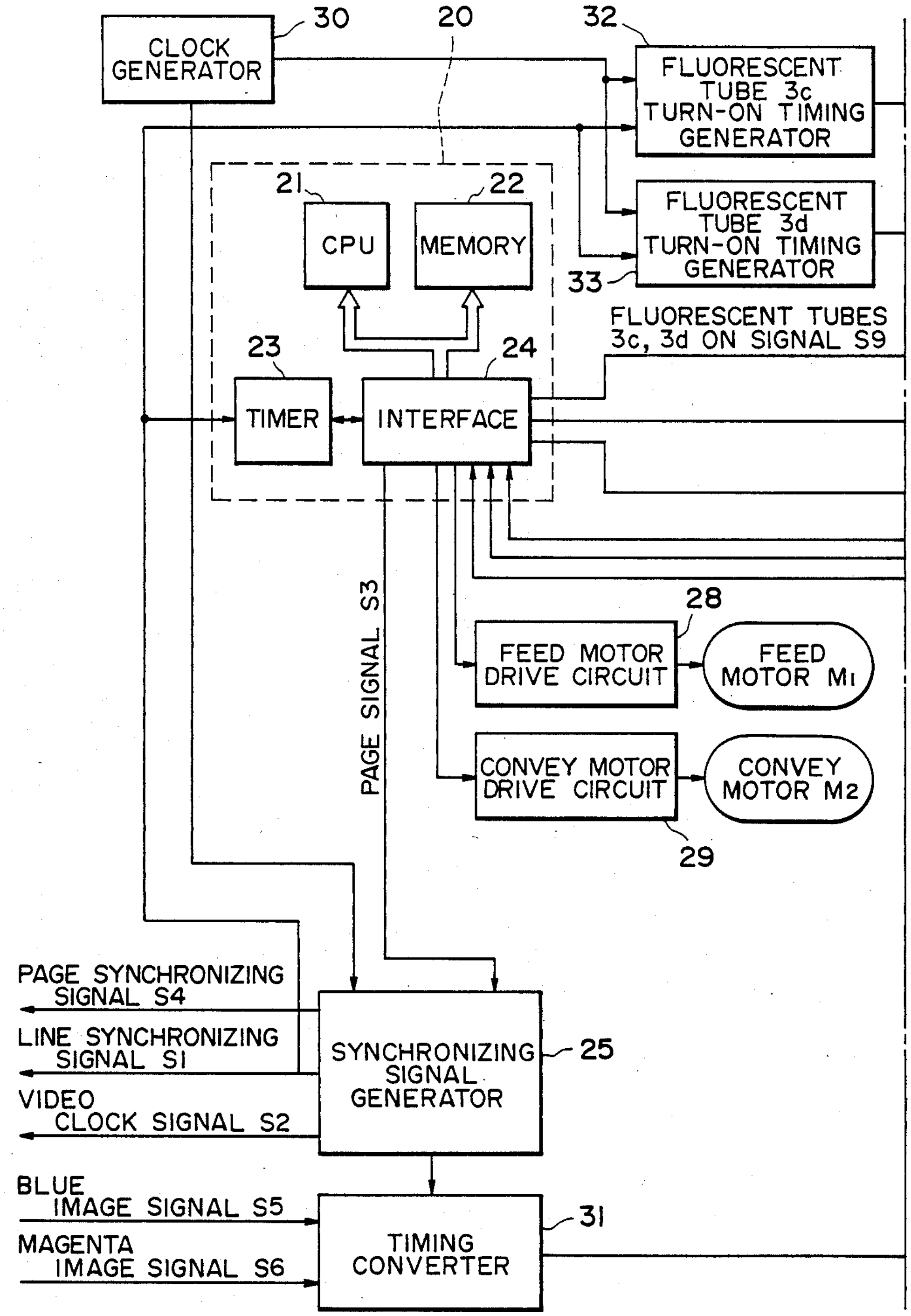
FIG. 9 composed of FIGS. 9A and 9B is a block diagram.
Figure 9B:
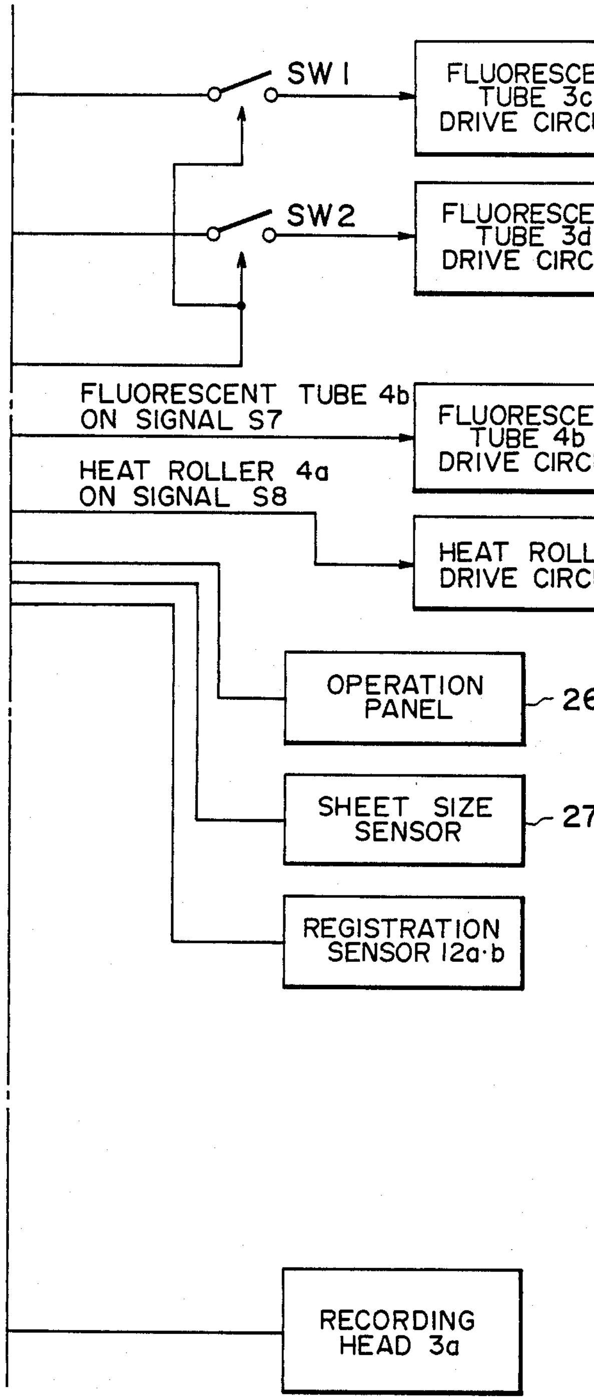
Figure 9:
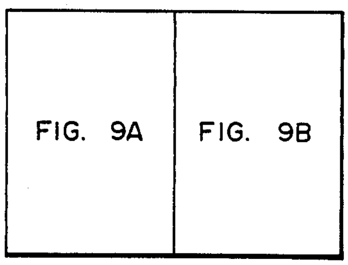

Next, description will be made of control of the above-described apparatus using a block diagram shown in FIG. 9.

A control system of the above-described apparatus is controlled by a microcomputer 20. This microcomputer 20 is mainly comprised of a microprocessor (CPU) 21, a memory 22, a timer 23, and an interface 24. The timer 23 transmits an elapse of time to the CPU 21 via the interface 24 by counting line synchronizing signals issued by a synchronizing signal generator 25, which will be described later. To the interface 24 are connected an operation panel for indicating the required number of sheets to be recorded, image density, the size, and the like, a sheet size sensor 27 for detecting the size of the recording paper 9 accommodated in the cassette 8, the registration sensors 12a, 12b for detecting whether or not the recording paper 9 is present in the registration section, and the like. Such information is input to the CPU 21 via the interface 24. In addition, the CPU 21 supplies signals to a feed motor drive circuit 28 and a convey motor drive circuit 29 via the interface 24 to effect ON/OFF control of the convey motor M2 Furthermore, the synchronizing signal generator 25, on receiving clock pulses from a clock generator 30, divides their frequency and produces a line synchronizing signal S1 and a video clock signal S2. The synchronizing signal generator 25 receives a page signal S3 from the CPU 21 via the interface 24, and, after adjusting its phase with that of the like synchronizing signal S1, produces a page synchronizing signal S4. It should be noted that the page synchronizing signal S4, the line synchronizing signal S1. and the image clock signal S2 are transmitters of a blue image signal S5 and a magenta image signal S6. and are transmitted to effect synchronization with a facsimile equipment, an image scanner, an electronic blackboard, or the like. The blue image signal S5 and the magenta image signal S6 transmitted from the image signal transmitter are subjected to timing conversion necessary for driving the recording head 3a, by a timing converter 31 using a line buffer and the like.

Figure 5:
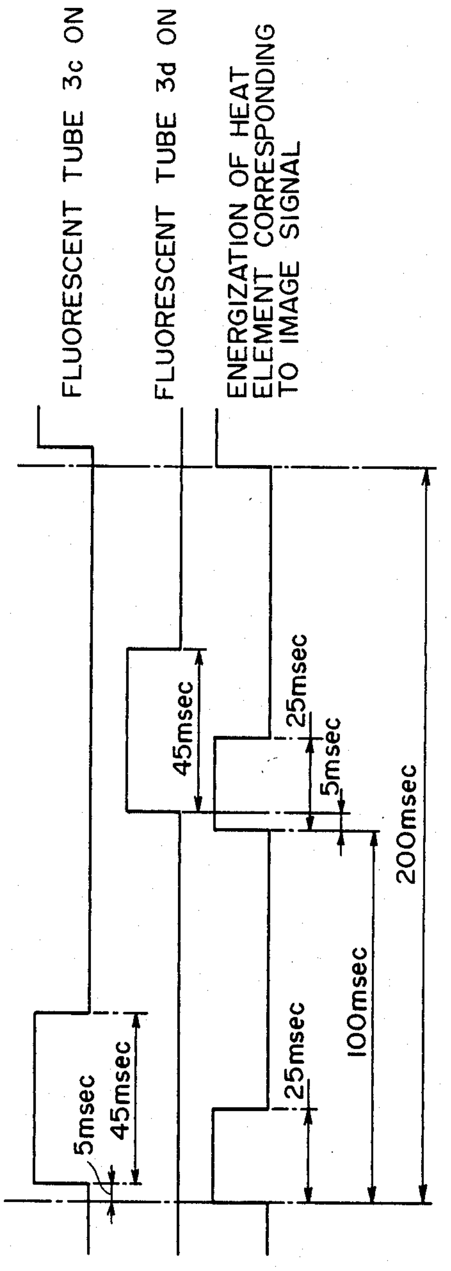
FIG. 5 is a timing chart for applying heat and light.

Furthermore, on receiving a clock line synchronizing signal from the clock generator 30, fluorescent tube 3c, 3d turn-on timing generators 32, 33, generate fluorescent tubes 3c, 3d ON signals S9 shown in FIG. 5. These turn-on signals are sent to fluorescent tubes 3c, 3d drive circuits 34, 35 via switches SW1, SW2 controlled by fluorescent tubes 3c, 3d ON signals sent from the CPU 21 via the interface 24, thereby flashing the fluorescent tubes 3c, 3d. In addition, the CPU 21 sends a fluorescent tube 4b ON signal S7 to a fluorescent tube 4b drive circuit 36 via the interface 24 so as to effect ON/OFF control of the fluorescent tube 4b. Furthermore, the CPU sends a heat roller 4a ON signal S8 to a heat roller 4*a* drive circuit so as to effect ON/OFF control of the heat roller 4*a*.

Figure 10B:
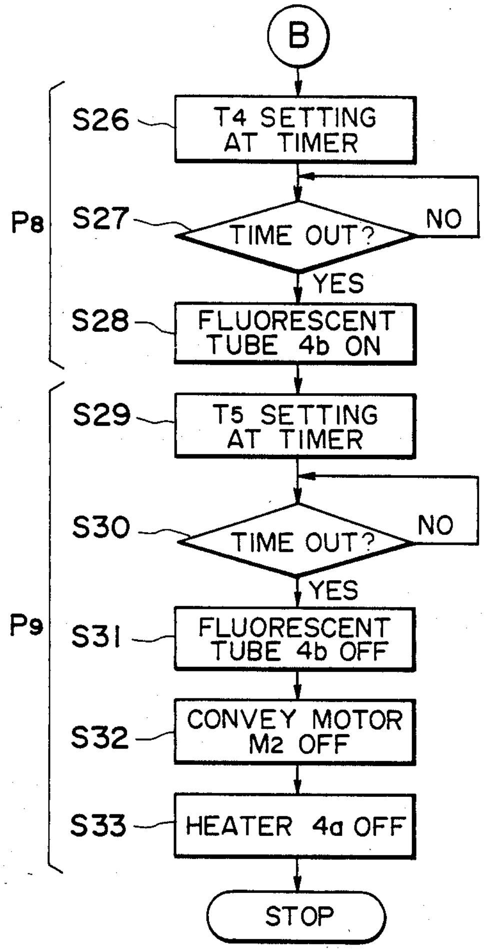
FIG. 10 composed of FIG. 10A and 10B is a flowchart.
Figure 10:
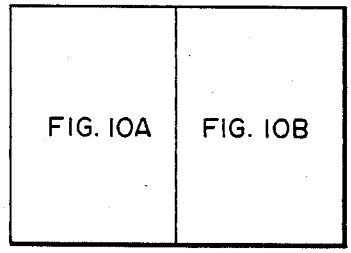
Figure 10A:
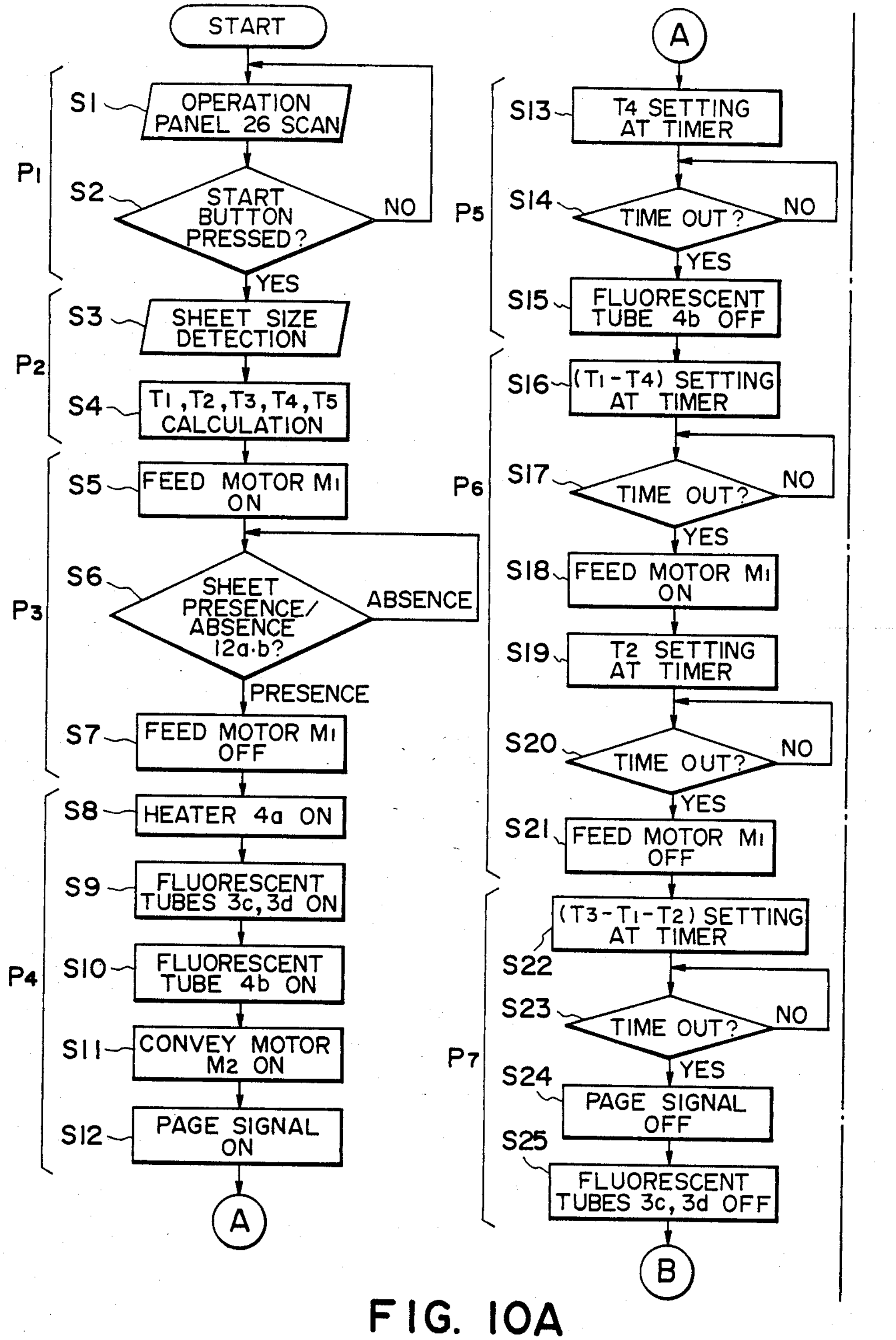

FIG. 10 shows a flowchart for controlling the above-described apparatus.

First, in Phase $P_1$, the operation panel 26 is scanned (Step S1), and whether or not the start button has been pressed is detected (Step S2). If NO is the answer, Phase P is repeated. If YES is the answer, the operation proceeds to Phase P2, the sheet size is detected (Step S3), and $T_1$, $T_2$, $T_3$, $T_4$, and $T_5$ shown in FIG. 8 are calculated on the basis of that information (Step S4). Then, in Phase $P_1$, the feed motor M is turned ON (Step S5), and the operation remains on standby until the recording paper 9 is fed to the registration sensors 12*a*, 12*b* (Step S6), and the feed motor $M_1$ is then turned OFF (Step S7). Next, in Phase $P_4$, the heater 4*a* is turned ON (Step S8), the fluorescent tubes 3*c*, 3*d*, and 4*b* are turned ON (Step S9, S10), and the convey motor $M_2$ is turned ON (Step S11). Furthermore, a page signal is transmitted to the synchronizing signal generator (Step S12). Incidentally, the heater 4*a* is provided with a temperature monitor using a thermistor, and there is provided a control system for maintaining the temperature of the heater 4*a* to a fixed level (about 100°±10° C.) by varying the power supply on the basis of the data of the temperature monitor. However, since this control means is well-known, a detailed description thereof will be omitted. In addition, the heater 4*a* has a small heat capacity and, after being turned ON, assumes its normal condition during the time $T_4$, which will be described later. Furthermore, in Phase $P_5$, the time $T_4$ is set at the timer (Step S13), the operation is set on standby until the time is out (Step S14), and the fluorescent tube 4*b* is then turned OFF (Step S15). In Phase $P_6$, the time $T_1$–$T_4$ is set, the operation remains on standby until the time is out (Step S16), i.e., after a lapse of $T_1$ calculated from Phase $P_4$ (Step S17), the feed motor $M_1$ is turned ON (Step S18), and after a lapse of the time $T_2$ the motor is turned OFF (Steps S19, S20, S21). As a result, the recording paper 9 reaches the transfer roller 5*a*. In Phase $P_7$, the time $T_3$–$T_1$–$T_2$ is set (Step S22), the operation remains on standby (Step S23) until the time is out. In other words, as the lapse of $T_3$ from Phase $P_4$, the transferred image-forming period terminated, and the page signal and the fluorescent tubes 3*c*, 3*d* are turned OFF (Steps S24, S25). Subsequently, in Phase $P_8$, the time $T_4$ is set (Step S26), the operation remains on standby (Step S27) until the time is out. When the terminating end of the transferred imageforming area of the transfer recording medium 1 reaches the heater 4*a*, the fluorescent tube 4*b* is turned ON (Step S28). In Phase $P_9$, the time $T_5$ is set (Step S29), and after the time is out (Step S30), i.e., after the terminating end of the transferred image-forming area reaches the release roller 6, the fluorescent tube 4*b*, the convey motor 4, and the heater 4*a* are turned OFF, thereby completing the operation (Steps S31, S32, S33).

Figure 11:
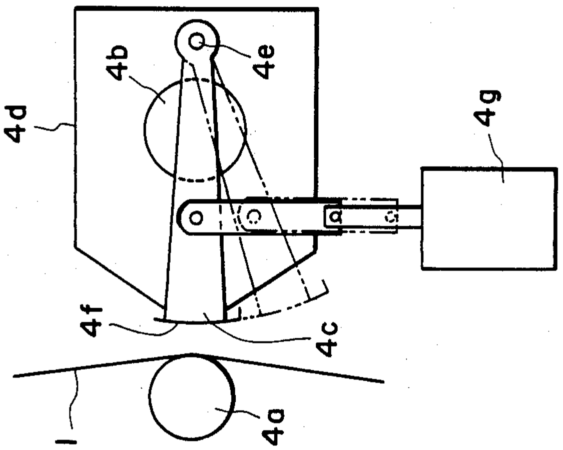
FIG. 11 is an explanatory diagram of another embodiment in which the non-transfer means is provided with a shutter.

Incidentally, although the above-described embodiment is arranged such that light is applied to the transfer recording layer 1*b* other than the image-forming area by controlling the flashing of the light source 4*b* of the non-transfer means, as another embodiment an arrangement may be provided such that light may be applied to the non-transfer portion of the transfer recording medium by providing a shutter 4*f* which is rotatable about the shaft 4*e* as a center, as shown in FIG. 11, and by rotating the shutter 4*f* by a solenoid 4*g* which is operated by predetermined signals to open and close the slit 4*f*.

Figure 12:
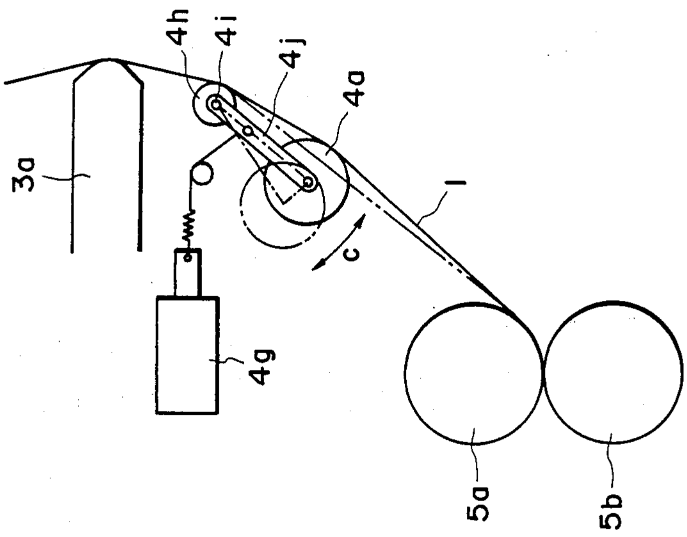
FIG. 12 is an explanatory diagram of another embodiment in which a means for releasing a heat roller of the non-transfer means is provided.

In addition, in the above-described embodiment, the non-transfer portion of the transfer recording medium 1 is made non-transferrable by uniformly applying heat energy and controlling the application of light energy in the non-transfer means 4. However, an arrangement may conversely be provided such that light energy is applied uniformly and the application of heat energy is controlled. For instance, an arrangement may be provided such that an arm 4*j* which is rotatable about a shaft 4*i* of a fixed guide roller 4*h* as a center is provided, as shown in FIG. 12, and, by rotating the arm 4*j* by the solenoid 4*g* in the direction of the arrow c, the heat roller 4*a* is brought into contact with and separated from the transfer recording medium 1. By virtue of this arrangement, it becomes possible for heat energy to be imparted only to the non-transfer portion of the transfer recording medium 1 by controlling the contact and separation of the heat roller 4*a*.

Figure 13:
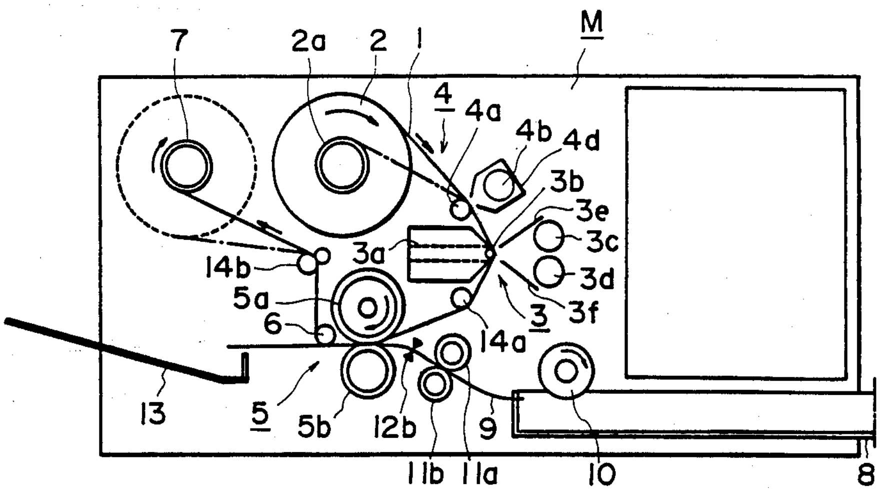
FIG. 13 is an explanatory diagram of another embodiment in which the non-transfer means is provided on the upstream side of a recording section.

Furthermore, although the non-transfer means 4 is disposed downstream of the recording section 3, a similar effect can be obtained even if the non-transfer means 4 is disposed upstream of the recording section 3, as shown in FIG. 13.

Figure 14:
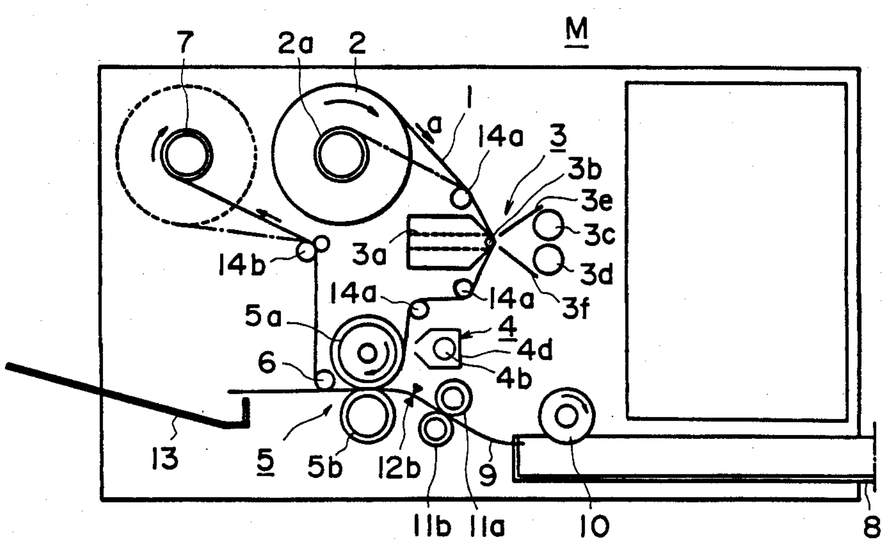
FIG. 14 is an explanatory diagram of another embodiment in which a heat-applying member of the non-transfer is means is jointly used as a transfer roller.

Moreover, although, in the above-described embodiment, the heat roller 4*a* is provided in the non-transfer means 4, and heat energy is applied to the transfer recording medium 1, an arrangement may also be made such that the non-transfer means 4 is disposed in the vicinity of the transfer section 5, as shown in FIG. 14, and the transfer roller 5*a* may be used commonly as a member for imparting the heat energy of the non-transfer means 4. This arrangement is effective since the number of components used in the non-transfer means 4 can be reduced.

Although, in the above-described embodiment, description has been made in the case of two-color recording, it is also possible to obtain a single- or full-color recorded image by appropriately selecting the kinds of colorant and reaction initiator constituting image-forming elements and by selecting a light source having a wavelength for reacting the reaction initiator.

Although the foregoing embodiment is arranged such that, in the recording section 3, light having a predetermined wavelength corresponding to a desired color is applied uniformly from the side of the transfer recording layer 1*b* of the transfer recording medium 1, and heat corresponding to image signals is applied from the side of the substrate 1*a*, as another embodiment, an arrangement may be provided such that heat is applied uniformly, and predetermined light is applied in correspondence with image signals.

In addition, if the substrate la is constituted by a light-transmissive material, an arrangement may be provided such that light is applied from the side of the substrate 1*a*, and heat is applied from the side of the transfer recording layers 1*b*.

Furthermore, in the foregoing embodiment, although the application of light and heat is effected with the substrate la placed in between, it is also possible to effect image formation by performing the application of both light and heat from one side of the substrate 1*a*.

As for the material of the substrate 1*a*, in addition to the aforementioned polyethylene phthalate, it is also possible to use polyamide, polyimide, condenser paper, cellophane paper, and so forth.

As for the irradiating means of the recording section 3, it is also possible to employ, for instance, a method in which an LED array is used, or one in which a xenon lamp and a filter which have matching light absorption characteristics in terms of their material. The same applies to the light source 4b of the non-transfer means 4.

As for the heating means, it is also possible to employ a method in which heating is carried out selectively using a YAG laser and a polygon mirror, in addition to the method of using the recording head 3a.

Furthermore, the recording medium should not be restricted to the aforementioned recording paper, and, for instance, a plastic sheet for an overhead projector (OHP) can naturally be used.

Incidentally, although, in the embodiment described above, heat energy and light energy are applied simultaneously, they may be applied separately, insofar as the two kinds of energy are applied as a consequence.

In the embodiment described above, an example has been shown in which an image is transferred onto recording paper by virtue of a change in the softening temperature of the transfer recording layer 1b of polymer material containing a colorant as a result of application of light and heat energy thereto. However, an arrangement may be provided such that an image is transferred and recorded by virtue of a difference in the characteristics of adhesion onto the recording paper or sublimation characteristics. Alternately, an arrangement may be provided such that the recording paper is provided with a coloring property, and the transfer recording medium is provided with such a layer that will change the coloring property of the recording paper, so that an image formed on the transfer recording medium is transferred onto the recording paper, thereby allowing a recorded image to be obtained.

Furthermore, the heat roller 4a of the non-transfer means 4 and the transfer roller 5a and pressure roller 5b of the transfer section 5 are respectively constructed in the form of rollers, but they may not be restricted to the form of rollers. For instance, the heat roller 4a may be constructed in the same manner as the recording head 3a, while the transfer roller 5a and the pressure roller 5b may be constructed in the form of rotary belts which are held in pressure contact with each other insofar as a desired pressure is obtained.

As described above, in this embodiment, since the formation of an image on the transfer recording medium and the transfer of that image onto the recording medium are effected consecutively, it becomes possible to record an image on a recording medium having a relatively low degree of surface smoothness. In addition, in cases where the embodiment is applied to multi-color images, recording can be performed without causing the recording medium to perform complicated functions.

In addition, since the portion of the transfer recording medium other than the image-forming area is arranged to be non-transferrable, even if the non-transfer portion of the transfer recording medium comes into contact with a member of the transfer section, it is possible to prevent the transfer recording layer from adhering to that member, thereby allowing a clear image free from stains to be recorded on the recording medium.

Description will now be made of a second embodiment of the present invention with reference to the accompanying drawings. In the embodiment which will be described below, since the arrangement of the apparatus and the control system are similar to those of the foregoing embodiment, said embodiment is applied in a similar manner.

Figure 15:
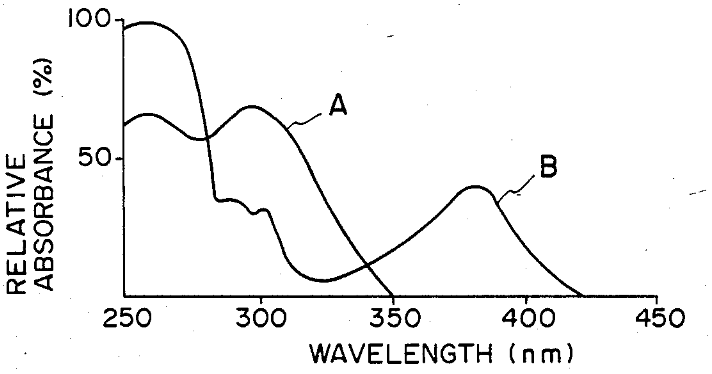
FIG. 15 is a diagram illustrating the spectroscopic characteristics of a reaction initiator in the transfer recording medium.
Figure 16:
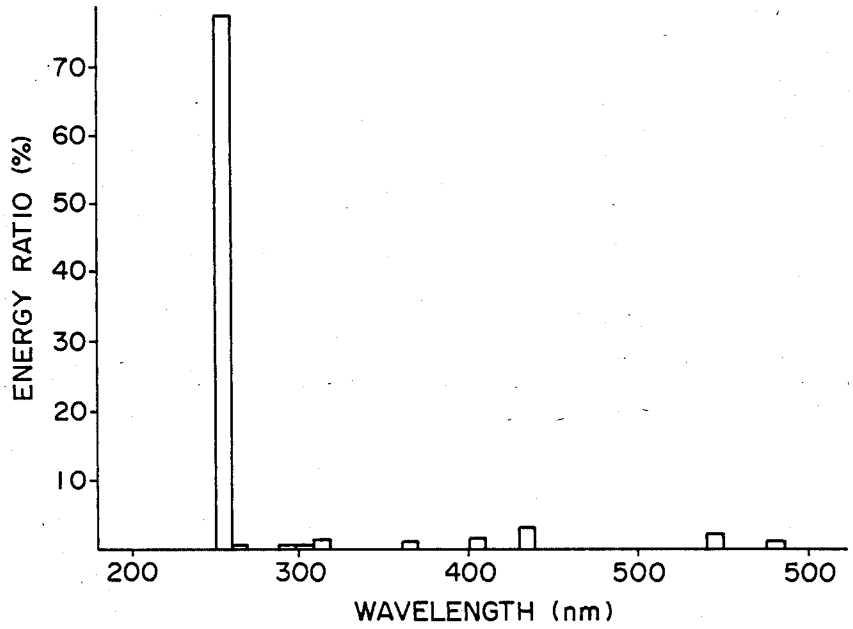
FIG. 16 is a diagram illustrating the spectroscopic characteristics of the light source in an offset-preventing means.

FIG. 15 is a diagram illustrating the spectroscopic characteristics of reaction initiators in the transfer recording medium, while FIG. 16 is a diagram illustrating the spectroscopic characteristics of a light source in an offset preventing means.

The embodiment which will be described below provides an image recording apparatus for recording an image on a recording medium by employing a transfer recording medium having a transfer recording layer which is constituted by two or more kinds of image-forming element each of which react to light of a predetermined wavelength and have physical properties governing transfer characteristics that change on application of light energy and heat energy thereto, comprising: a recording section disposed along a conveying route of the transfer recording medium and including heating means for applying heat energy to the transfer recording medium in correspondence with image information and irradiating means for applying light energy to the transfer recording medium; a transfer section for transferring onto the recording medium the image formed on the transfer recording medium in the recording section; and offset-preventing means disposed upstream of the transfer section in the advancing direction of the transfer recording medium and including heating means for applying heat energy to portions of the transfer recording layer other than its image-forming area and irradiating means for applying light energy having a wavelength to which the image-forming elements commonly react.

In other words, the embodiment to be described below is arranged such that light energy having a wavelength allowing image-forming elements to be commonly reacted is imparted by the aforementioned light source 4b.

In accordance with the above-described apparatus, if recording is effected by setting the transfer recording medium and the recording medium in the apparatus, an image is formed as predetermined heat energy and light energy are applied to the transfer recording medium in the recording section, and that image is transferred onto the recording medium in the transfer section.

With respect to portions of the transfer recording medium other than an image-forming area, heat energy and light energy having a wavelength for commonly reacting all the image-forming elements are imparted to those portions by means of the offset-preventing means. As a result, those portions become non-transferrable, so that even if those portions come into contact with a member of the transfer section, the transfer recording layer is not adhered to that member.

The transfer recording medium 1 used in this embodiment is arranged such that, as shown in FIG. 2, the transfer recording layer 1b having a property capable of forming an image thereon when both heat energy and light energy are applied thereto is adhered to the sheet-like substrate 1a.

To explain an example thereof, as shown in FIG. 2, the transfer recording layer 1b is constituted by microcapsule-like image-forming elements formed by the following method using the components shown in Tables 3 and 4 as cores 1c, 1d.

In other words, 10 g of components shown in Tables 3 and 4 is mixed with 20 wt. % of methylene chloride, and this mixture is then mixed with 200 ml of water in which 1 g of gelatine and a cationic or nonionic surface active agent having an HLB value of at least 10 or above is dissolved. This mixture is agitated by a homomixer held at a temperature of 60° C. at a speed of 8000–10,000 r.p.m. to emulsify the same, thereby obtaining oily droplets having an average particle diameter of 26 μm.

Furthermore, the mixture is further agitated for 30 minutes at 60° C., and the average particle diameter is reduced to approximately 10 μm by removing methylene chloride. 20 ml of water in which 1 g of gum arabic is dissolved is added to the same. Subsequently, aqueous $NH_4OH$ (ammonium) is added to the mixture while cooling it gradually to set the pH to 11 or above, and a microcapsule slurry is thereby obtained. The walls of the microcapsules are hardened by gradually adding 1.0 ml of a 20% aqueous solution of glutaraldehyde to the same.

Subsequently, the microcapsule slurry is separated into a solid and a liquid using a Nutsche funnel, and the solid is then dried by a vacuum cleaner for 10 hours at 35° C., thereby obtaining microcapsule-like image-forming elements.

These image-forming elements are microcapsules in which the components **1*c*, 1*d* of Tables 3 and 4 are respectively covered with shells 1*e***, and are formed into a particle size of 7–15 μm and an average particle size of 10 μm.

The image-forming elements thus formed are adhered on the substrate la constituted by a 6 μm-thick polyethylene terephthalate film, using an adhesive material lf obtained by adding several droplets of a surface active agent to a 5% aqueous solution of PVA per 100 cc, thereby forming the transfer recording layer **1*b*. Thus, the transfer recording medium 1** is arranged.

TABLE 3

| Item | Component | wt. % |
|---|---|---|
| Polymerizable prepolymer | $(CH_2{=}CHCOOCH_2.CH_2.O.CO.$ 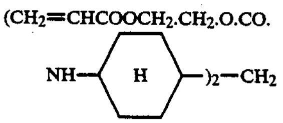 | 70 |
| Reaction initiator | 1-phenyl-1,2-propanedione-2-(O—ethoxycarbonyl)-Oxime | 11 |
| Binder | Elvasite 2041 (mfd. by Du Pont) | 17 |
| Colorant | Diaresin Red K (mfd. by Mitsubishi Chemical Industries, Ltd.) | 2 |

TABLE 4

| Item | Component | wt. % |
|---|---|---|
| Polymerizable prepolymer | $(CH_2{=}CHCOOCH_2.CH_2.O.CO.$ 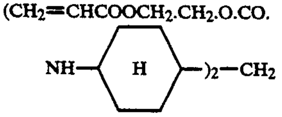 | 75 |
| Reaction initiator | 2-chlorothioxanthone/ethyl-P—dimethyl-amino-benzoate | 1.5/3 |
| Binder | Elvasite 2041 (mfd. by Du Pont) | 18.5 |
| Colorant | Diaresin Blue K (mfd. by Mitsubishi Chemical Industries, Ltd.) | 2 |

The reaction initiator shown in Table 3 above starts reaction by absorbing the light in the range of Curve A in the spectroscopic characteristics of FIG. 15 and assumes a color of magenta at the time of image formation. Meanwhile, the reaction initiator shown in Table 4 starts reaction by absorbing the light in the range of Curve B of FIG. 15 and assumes a color of blue at the time of image formation.

In other words, as shown in FIG. 15, the image-forming elements of Table 3 react to the light having a wavelength of 300 nm or thereabout, and the image-forming elements of Table 4 to the light having a wavelength of 370 nm or thereabout, respectively. Furthermore, both the image-forming elements shown in Tables 3 and 4 react to the light having a wavelength of 250 nm or thereabout.

Description will now be made of the offset-preventing means 4. This offset-preventing means 4 is disposed downstream of the recording section 3 in the advancing direction of the transfer recording medium 1, and the heat roller **4*a* for coming into contact with the side of the substrate 1*a* of the transfer recording medium 1 to heat the same uniformly and the light source 4*b* for applying light to the side of the transfer recording layer 1*b* are disposed such as to face each other. In addition, the light-shielding plate 4*d* having the 3 mm-wide slit is disposed between the light source 4*b* and the transfer recording medium 1, so as to allow the light of the light source 4*b* to pass through the slit 4*c* and not to be applied to portions of the transfer recording medium other than those in contact with the heat roller 4*a***.

Incidentally, the light of the light source **4*b* has a wavelength to which both of the reaction initiators contained in the image-forming elements shown in Table 3 and 4 react, i.e., the wavelength of 250 nm or thereabout. In this embodiment, a low-pressure mercury vapor lamp exhibiting the spectroscopic characteristics of FIG. 16 is used. This light source 4*b* is so arranged as to flash in response to signals issued from a control section (not shown) in correspondence with the conveyance of the transfer recording medium 1**.

Accordingly, in this embodiment, as in the case of the foregoing embodiment, light energy is applied by controlling the flashing of the light source **4*b*, and heat energy is imparted by the heat roller 4*a*, thereby making those portions of the transfer recording layer 1*b* other than an image-forming area non-transferrable. An image formed on the transfer recording medium 1 is superposed on the recording paper 9 by superposing the transfer recording medium 1 and the recording paper 9 in the transfer section 5 and by heating and pressuriziation it is transferred onto the recording paper 9**.

As described above, a transferred image of the two colors of magenta and blue is recorded on the recording paper 9, and since the exposed regions of the transfer recording layer **1*b* are non-transferrable, even if those portions come into contact with the pressure roller 5*b*, the transfer recording layer is not adhered to the roller 5*b***.

Subsequently, the recording paper 9 onto which the image has been transferred is released from the transfer recording medium 1 by means of the release roller 6, and is discharged onto the discharge tray 13.

In accordance with this embodiment described above, since a light having a wavelength to which the image-forming elements in the transfer recording layer commonly react is used at the time of preventing the offset; the arrangement and control of the irradiating means in the offset-preventing means can be simplified.

A third embodiment will be described hereafter with reference to FIGS. 17–20.

In the embodiment described below, there is provided an image recording apparatus for recording an image on a recording medium by employing a transfer recording medium having a transfer recording layer whose physical properties governing transfer characteristics change on application of light energy and heat energy thereto, comprising: a recording section disposed along a conveying route of the transfer recording medium which is conveyed and including heating means for applying heat energy to the transfer recording medium and irradiating means for applying light energy to the transfer recording medium; a transfer section for transferring onto the recording medium the image formed on the transfer recording medium in the recording section; and offset-preventing means disposed upstream of the transfer section in the advancing direction of the transfer recording medium and adapted to be capable of applying heat energy and light energy to portions of the transfer recording layer other than its image-forming area and capable of varying the width of a heating source in correspondence with the size of image formation.

In accordance with the aforementioned means, if recording is effected by setting the transfer recording medium and the recording medium in the apparatus, an image is formed when predetermined heat energy and light energy are imparted to the transfer recording medium in the recording section, and the image is transferred onto the recording medium.

In cases where the size of the transfer recording medium is larger than that of the recording medium, heat energy and light energy are applied to portions of the transfer recording medium other than its image-forming area by the offset-preventing means in accordance with its size. Consequently, since those portions become non-transferrable, even if they come into contact with a member of the transfer section, the transfer recording layer is not adhered to that member.

An embodiment of the present invention to which the aforementioned means is applied will be described below.

Figure 17:
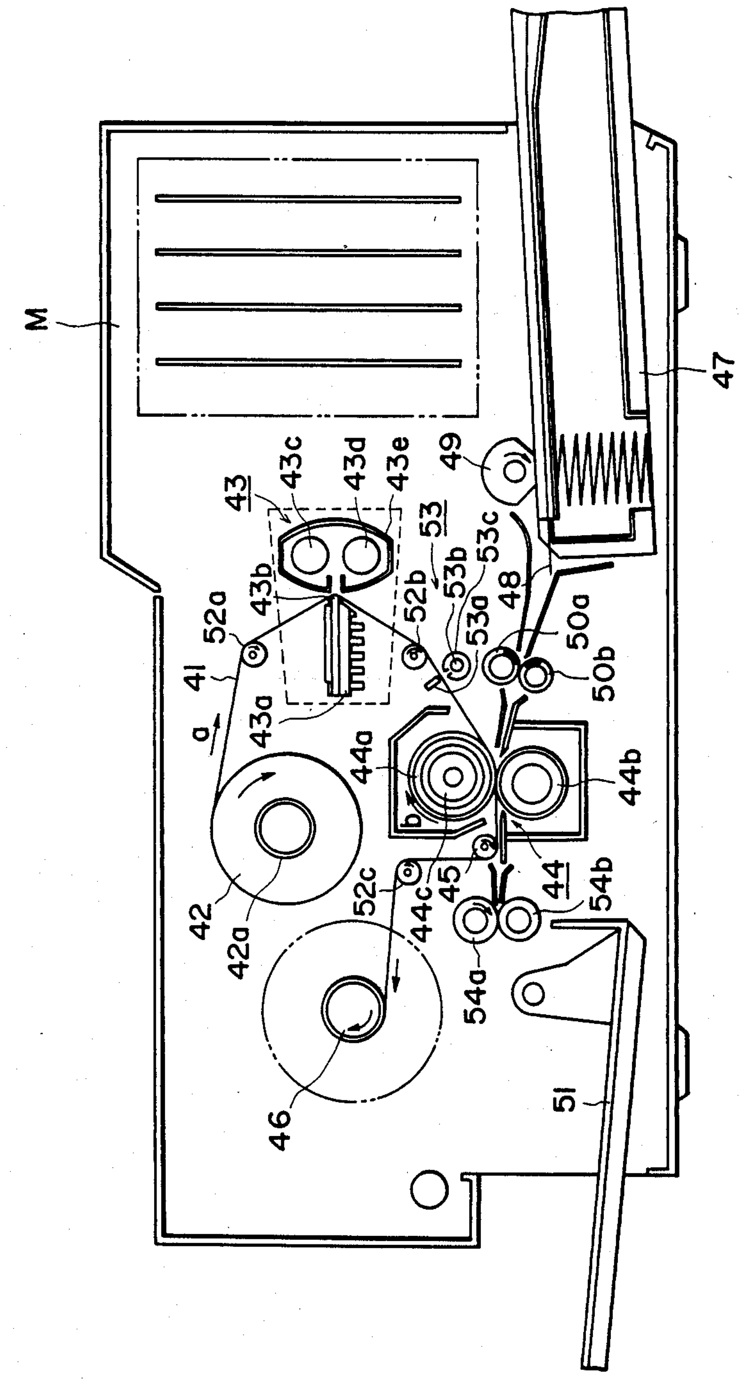
FIG. 17 is a side elevational view schematically illustrating one embodiment of the present invention.
Figure 18:
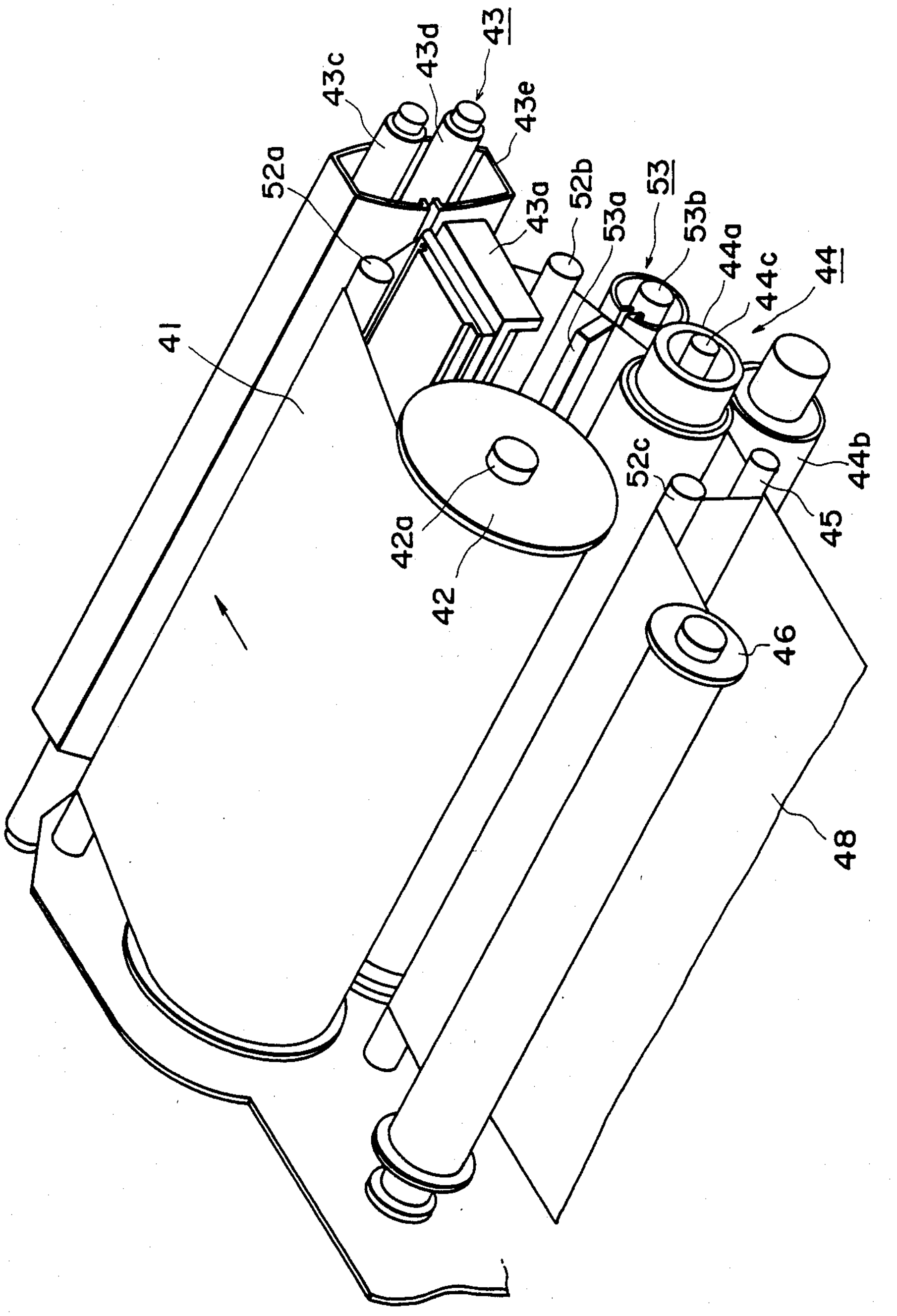
FIG. 18 is a schematic perspective view thereof.

FIG. 17 is a schematic diagram of the recording apparatus, while FIG. 18 is a schematic perspective view thereof.

In the drawings, an elongated sheet-like transfer recording medium 41 is wound up in the form of a roll and is incorporated detachably in the main body M of the apparatus as a supply roll 42. In other words, this supply roll 42 is mounted detachably on a rotatable shaft 42*a* provided in the main body M of the apparatus.

First, the tip of the transfer recording medium 41 is guided along a guide roller 52*a*, a recording head 43*a*, a guide roller 52*b*, and it is led between a transfer roller 44*a* and a pressure roller 44*b*, is redirected by a release roller 45 and a guide roller 52*c*, is led to a takeup roll 46 where it is retained by a retaining means such as a gripper (not shown). Subsequently, by rotating the takeup roll 46 by a known driving means, the transfer recording medium 41 is paid out in the direction of the arrow a and is consecutively wound up around the peripheral surface of the takeup roll 46.

Incidentally, at the time of the winding-up operation, the supply roll 42 is given a fixed back tension by means of, for instance, a hysteresis brake (not shown), and the arrangement is such that the transfer recording medium 41 is conveyed while being held in pressure contact with a recording head 43*a* with a constant pressure and at a predetermined angle therewith by means of this tension and the guide rollers 52*a*, 52*b*.

The transfer recording medium 41, the recording section 43, the transfer section 44, and the like are similar to those of the embodiment shown in FIG. 1, so that the description thereof applies in the same manner.

Description will now be made of the offset-preventing means 53 in accordance with this embodiment. This offset-preventing means 53 is disposed between the recording section 43 and the transfer section 44. In the offset-preventing means 53 a heating means 53*a* for coming into contact with the side of the substrate 41*a* of the transfer recording medium 41 and heating the same in correspondence with the size of the recording paper 48 and a light source 53*b*, i.e., an irradiating means for applying light to the side of an transfer recording layer 41*b*, are disposed such as to face each other. In addition, a slit plate 53*c* is disposed between the light source 53*b* and the transfer recording medium 41, so as to prevent the light of the light source 53*b* from being applied to positions of the transfer recording layer 41*b* other than those being heated by the heating means 53*a*.

Figure 19B:
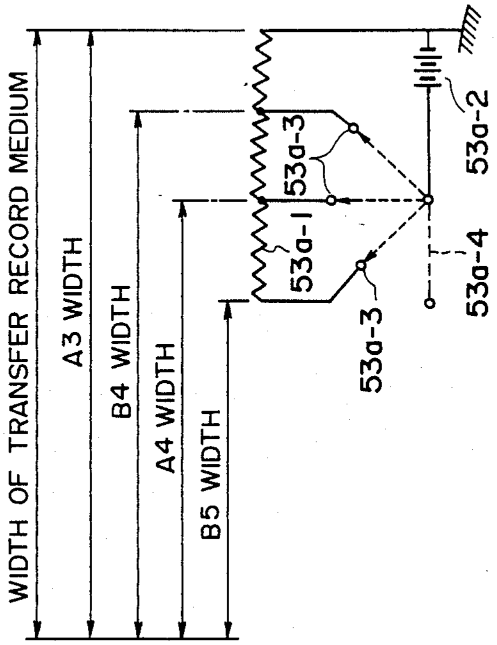
FIGS. 19A, 19B and 20A, 20B are schematic diagrams illustrating the offset-preventing means.
Figure 19A:
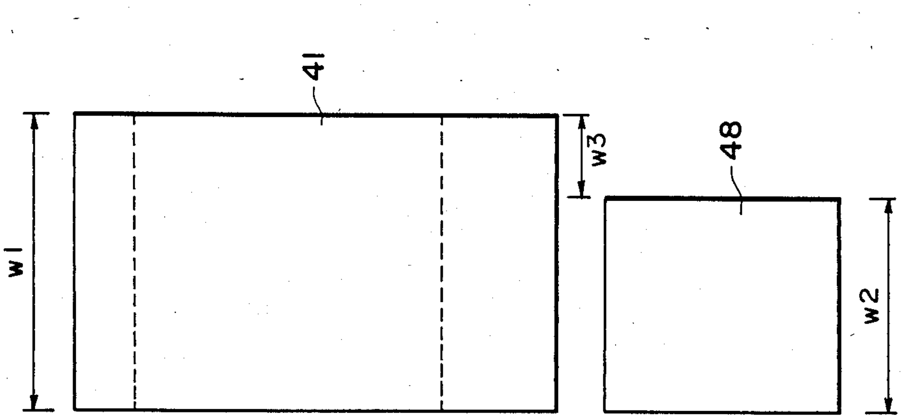

As shown in FIG. 19A, the heating means 53*a* is arranged such that heating is effected by a difference between the width $W_1$ of the transfer recording medium 41 and the width $W_2$ of the recording paper 48 when the recording paper is superposed on the transfer recording medium 41, i.e., the excess portion of the transfer recording medium 41 "$W_1-W_2=W_3$". For example, as shown in FIG. 19B, an arrangement is made such that a power source 53*a*-2 is connected to one end of a heating resistor 53*a*-1 of a predetermined length, a terminal 53*a*-3 is connected to predetermined positions of the heating resistor 53*a*-1, and a predetermined length of the heating resistor 53*a*-1 can be heated by changing over a changeover switch 53*a*-4 connected from the power source 53*a*-2 to the terminal 53*a*-3 set in place. For instance, the arrangement is such that, in cases where the width $W_1$ of the transfer recording medium 41 has the width of A3 size by providing the terminal 53*a*-3 at positions corresponding to the excess widths when the recording paper 48 of the B5, A4, or B4 size is superposed on the transfer recording medium 41, heating is effected for the portions of the excess width $W_3$ of the transfer recording medium 41, i.e., portions thereof other than the image-forming area.

Figure 20A:
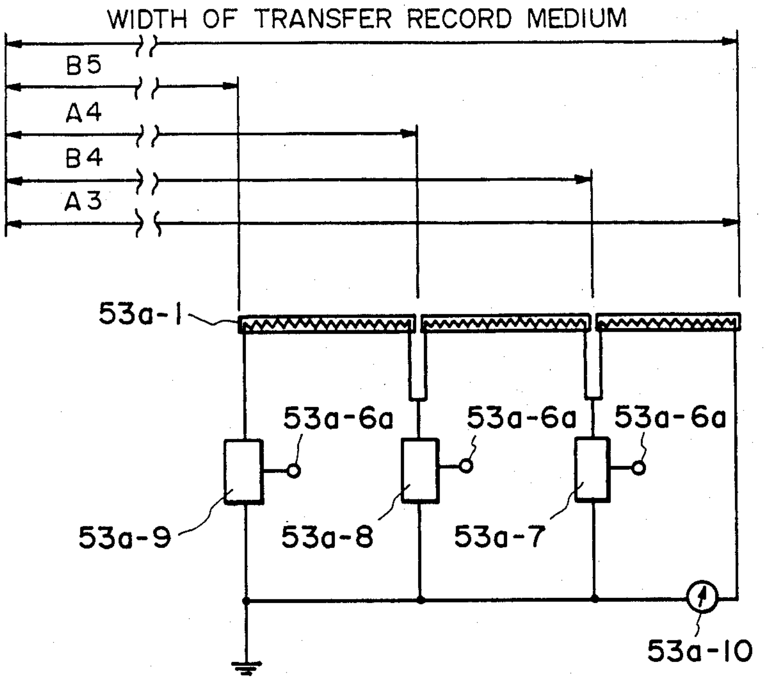
Figure 20B:
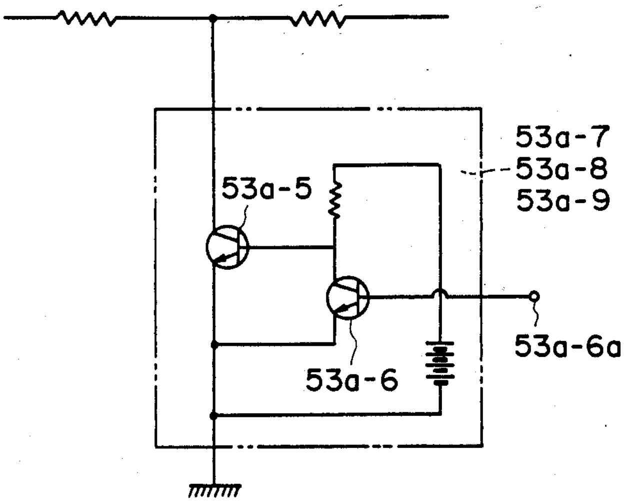

In addition, if the aforementioned changeover switch is constituted by a transistor switching circuit as shown in FIG. 20A, it becomes possible to effect the switchover operation automatically. In other words, as shown in FIG. 20B, switching circuits 53*a*-7, 53*a*-8, and 53*a*-9 each composed of a power transistor 53*a*-5 and a switching transistor 53*a*-6 are respectively connected to the terminal 53*a*-3, and a base 53*a*-6*a* of each of the switching transistors 53*a*-6 is connected to the CPU to effect ON/OFF control. If the ON and OFF operation of the respective power transistors 53*a*-5 is controlled, as shown in Table 5, it becomes possible to heat the heating resistor 53*a*-1 in accordance with predetermined lengths. Incidentally, reference numeral 53*a*-10 in FIG. 20A denotes a constant current source.

TABLE 5

| | Power Transistor | | |
|---|---|---|---|
| Sheet size | 15a–7 | 15a–8 | 15a–9 |
| A3 | OFF | OFF | OFF |
| B4 | ON | OFF | OFF |
| A4 | OFF | ON | OFF |

TABLE 5-continued

| | Power Transistor | | |
|---|---|---|---|
| Sheet size | 15a-7 | 15a-8 | 15a-9 |
| B5 | OFF | OFF | ON |

As for the light of the light source 53$b$, one having the wavelength capable of reacting both the reaction initiators of Tables 1 and 2 is used.

As for the transfer recording medium 41 on which an image is formed in a manner similar to those of the foregoing embodiments, light is applied thereto from the light source 53$b$ by means of the above-described offset-preventing means 53, and portions of the transfer recording layer 41$b$ outside the size of the recording paper 48 are heated by the heating means 53$a$, thereby making those portion non-transferrable.

Furthermore, in the transfer section 44, by bringing the transfer recording layer 41$b$ on which the image has been formed into pressure contact with the recording paper 48 and by heating the same, it becomes possible to transfer onto the recording paper 48 the transferred image of the two colors of blue and magenta. Subsequently, the advancing direction of the transfer recording medium 41 is changed by a release roller 45 to release the same from the recording paper 48, and the recording paper 48 with the recording of the image of desired colors is discharged onto a discharging tray by means of a pair of paper-discharging rollers 54$a$, 54$b$.

At the time of the above-described transfer, since the projecting portions of the transfer recording medium 41 superposed on the recording paper 48 are made non-transferrable, even if those portions of the transfer recording layer 41$b$ come into contact with the pressure roller 44$b$, they are not adhered to it, and the two-color recording is effected in one shot.

It should be noted that although, in the above-described embodiment, the offset-preventing means 53 is provided with the light source 53$b$, if the offset-preventing means 53 is provided in the vicinity of the recording section 43, the light source of the recording section 43 can be used jointly for the prevention of the offset.

In addition, although in the above-described embodiment the offset-preventing means 53 is interposed between the recording section and the transfer section 44, the offset-preventing means 53 may be disposed upstream of the recording section 43 in the advancing direction of the transfer recording medium 41.

As described above, since the present embodiment is arranged such that portions of the transfer recording medium other than an image-forming area are made non-transferrable in accordance with the size of the recording medium, even if the transfer portions of the transfer recording medium come into contact with a member of the transfer section, it is possible to prevent the transfer recording layer from becoming adhered to the member, so that there is an advantage in that a clear image free of stains can be recorded on the recording medium.

Figure 20C:
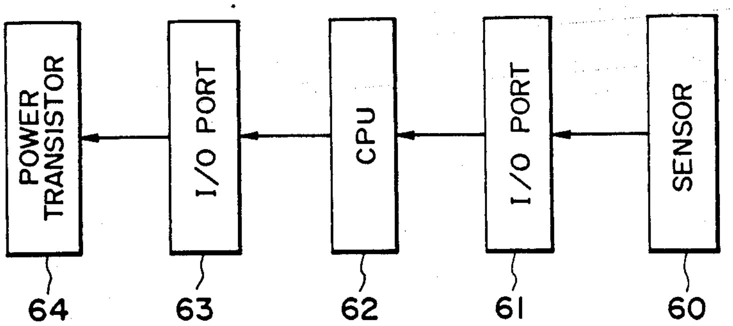
FIG. 20C is a block diagram.
Figure 20D:
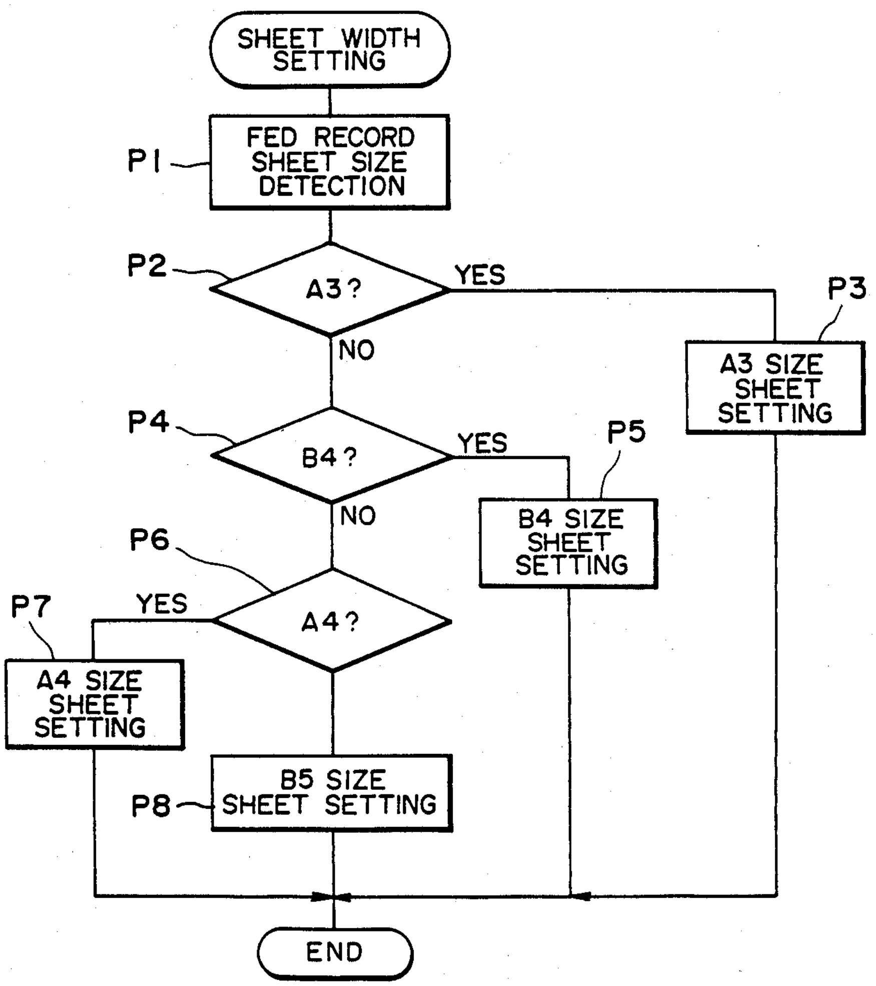
FIG. 20D is a flowchart.

A block diagram and a flowchart of a control system of the above-described apparatus are shown in FIGS. 20C, 20D.

First, description will be made of the block diagram shown in FIG. 20C.

In the drawing, a sensor 60 detects the size of the recording paper 48 accommodated in a cassette 47. For example, differences in the mechanical configuration are provided in the cassette 47 in correspondence with the sizes of the recording paper 48, or magnets are installed at different positions of the cassette 47 to differentiate the sizes, so as to allow the size of the recording paper 48 to be detected by the sensor 60. A detection signal from this sensor 60 is input via an I/O port 61 to a CPU 62 similar to those of the foregoing embodiments. The CPU 62 is capable of driving power transistors 64 via the I/O port 63 in accordance with Table 5.

Subsequently, the size of the recording paper 48 is detected by the CPU 62, and the flowchart for setting the power transistors 64 in compliance with Table 5 in accordance with the size is shown in FIG. 20D.

Description will be made of a method of setting the sheet width in accordance with the flowchart shown in FIG. 20D. First, the size of the recording paper 48 being fed is detected in Phase $P_1$. Using the information on the sheet size thus detected, determination is made in Phase $P_2$ as to whether or not the sheet is A3 size. If YES is the answer, the operation proceeds to phase $P_3$, and a group of power transistors corresponding to the A3 size are set, thereby completing the processing of the sheet width setting. If the size is not A3, the operation proceeds to Phase $P_4$, and determination is made as to whether or not the size is B4. If YES is the answer, the operation proceeds to Phase P5, and a group of power transistors corresponding to the B4 size are set, thereby completing the processing of the sheet width setting. If the size is not B4, the operation proceeds to Phase $P_6$, and determination is made as to whether the size is A4. If YES is the answer, the operation proceeds to Phase $P_7$, and a group of transistors corresponding to the A4 size are set, thereby completing the processing. If the size is not A4, a group of power transistors corresponding to the B5 size are set, thereby completing the processing. Although, in the above, cases where four kinds of sheet size, i.e., A3, B4, A4, and B5, are used have been described by way of example, it can be readily appreciated that the sheet width setting can be effected with the same arrangement in cases where other sheet sizes (e.g., letter size, legal size, and A5 size) are used.

Description of a fourth embodiment will be made hereafter with reference to FIGS. 21 to 25, wherein the overall structure of the apparatus is the same as that of the embodiment previously shown in FIGS. 17 and 18 and the transfer recording medium has a structure similar to that of the embodiment shown in FIG. 2. Therefore, only points of difference will be described below.

This embodiment provides a recording method in which, at the time of transferring a transferred image onto the recording medium after superposing on the recording medium the transfer recording medium with the transferred image formed thereon in the transfer section, even if portions of the transfer recording medium where the recording medium is not superposed, i.e., portions where the transfer recording layer of the transfer recording medium is exposed, come into contact with a member of the transfer section such as the transfer roller, the transfer recording layer is not adhered to that member.

To this end, in accordance with this embodiment, there is provided a method of image recording comprising: conveying a transfer recording medium having a transfer recording layer whose transfer characteristics change on application of light energy and heat energy thereto; forming a transferred image by selectively applying heat energy to the transfer recording layer in a recording section in correspondence with image information and by imparting light energy thereto; applying both light energy and heat energy to portions of the transfer recording layer other than a transferred image-forming area; and bringing the transfer recording layer into close contact with the recording medium to transfer the transferred image onto the recording medium.

In accordance with the above-described method, a transferred image is formed in the image-forming area of the transfer recording medium since light and heat energy is selectively imparted thereto. In the portions other than the image-forming area, however, both light and heat energy are applied to the entire portions thereof so that those portions become non-transferrable. Consequently, even if those portions come into contact with a member of the transfer section, the transfer recording layer is not adhered to that member.

The transfer recording medium 41 used in this embodiment has a structure as shown in FIG. 2, and its material is as follows. In other words, 10 g of components shown in Tables 6 and 7 is mixed with 20 wt. % of methylene chloride, and this mixture is then mixed with 200 ml of water in which 1 g of gelatine and a cationic or nonionic surface active agent having an HLB value of at least 10 or above is dissolved. This mixture is agitated by a homo-mixer held at a temperature of 60° C. at a speed of 8000–10,000 r.p.m. to emulsify the same, thereby obtaining oily droplets having an average particle diameter of 26 μm.

Furthermore, the mixture is further agitated for 30 minutes at 60° C., and the average particle diameter is reduced to approximately 10 μm by removing methylene chloride. 20 ml of water in which 1 g of gum arabic is dissolved is added to the same. Subsequently, $NH_4OH$ (ammonium) water is added to the mixture while cooling it gradually to set the pH to 11 or above, and a microcapsule slurry is thereby obtained. The walls of the microcapsules are hardened by gradually adding 1.0 ml of a 20% aqueous solution of glutaraldehyde to the same.

Subsequently, the microcapsule slurry is separated into a solid and a liquid using a Nutsche funnel, and the solid is then dried by a vacuum cleaner for 10 hours at 35° C., thereby obtaining microcapsule-like image-forming elements.

These image-forming elements are microcapsules in which the components 41*c*, 41*d* of Tables 6 and 7 are respectively covered with shells 41*e*, and are formed into a particle size of 7–15 μm and an average particle size of 10 μm.

The image-forming elements thus formed are adhered on the substrate 41*a* constituted by a 6 μm-thick polyethylene terephthalate film, using an adhesive material 41*f* obtained by adding several droplets of a surface active agent to a 5% aqueous solution of PvA per 100 cc, thereby forming the transfer recording layer 41*b*. Thus, the transfer recording medium 41 is arranged.

TABLE 6

| Item | Component | wt. % |
|---|---|---|
| Polymerizable prepolymer | $(CH_2{=}CHCOOCH_2.CH_2.O.CO.NH{-}\langle H \rangle{-})_2{-}CH_2$ | 70 |
| Reaction | Dichlorobenzophenon/ | 4/7 |

TABLE 6-continued

| Item | Component | wt. % |
|---|---|---|
| initiator | ethyl-P—dimethyl-amino-benzoate | |
| Binder | Elvasite 2041 (mfd. by Du Pont) | 17 |
| Colorant | Diaresin Red K (mfd. by Mitsubishi Chemical Industries, Ltd.) | 2 |

TABLE 7

| Item | Component | wt. % |
|---|---|---|
| Polymerizable prepolymer | $(CH_2{=}CHCOOCH_2.CH_2.O.CO.NH{-}\langle H \rangle{-})_2{-}CH_2$ | 75 |
| Reaction initiator | 2-chlorothioxanthone/ethyl-P—dimethyl-amino-benzoate | 1.5/3 |
| Binder | Elvasite 2041 (mfd. by Du Pont) | 18.5 |
| Colorant | Diaresin Blue K (mfd. by Mitsubishi Chemical Industries, Ltd.) | 2<br>2 |

Figure 21:
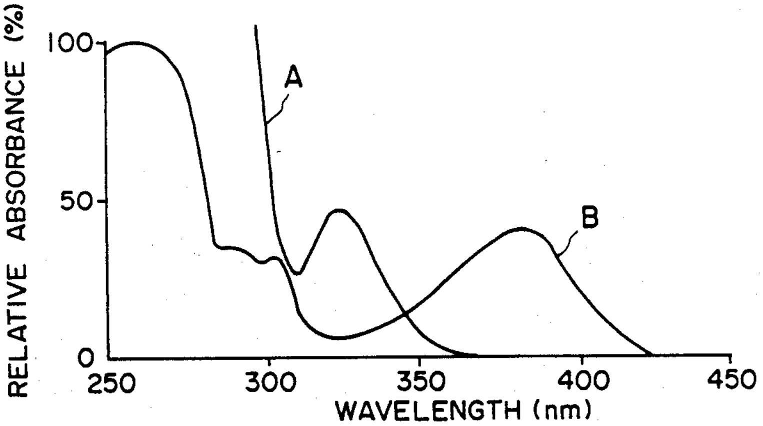
FIG. 21 is a diagram illustrating the spectroscopic characteristics of a reaction initiator in the transfer recording medium.

The reaction initiator shown in Table 6 above starts reaction by absorbing the light in the range of Curve A in the spectroscopic characteristics of FIG. 21 and assumes a color of magenta at the time of image formation. Meanwhile, the reaction initiator shown in Table 7 starts reaction by absorbing the light in the range of Curve B of FIG. 21 and assumes a color of blue at the time of image formation.

Figure 22:
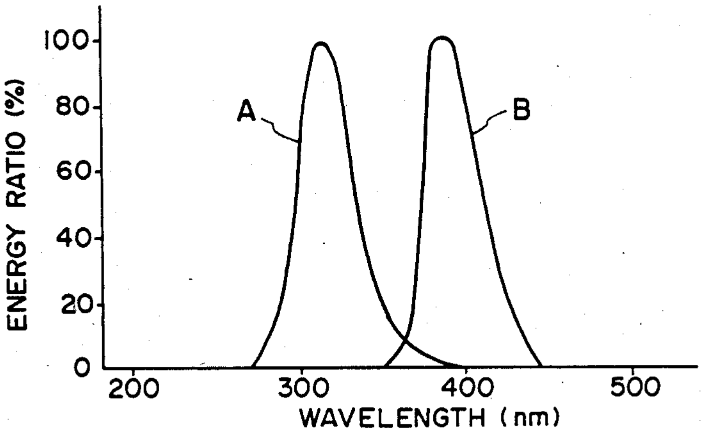
FIG. 22 is a diagram illustrating the spectroscopic characteristics of an irradiating means.

In this embodiment, as the fluorescent tube 43*c* having the spectroscopic characteristics of Curve A in FIG. 22, a 20-Watt health-ray fluorescent tube FL20SE made by Toshiba Corporation is used, while as the other fluorescent tube 43*d* having the spectroscopic characteristics of Curve B, a 20-Watt fluorescent tube FL10A70E 39 made by Toshiba Corporation is used.

Description will now be made of the non-transfer treatment process in accordance with this embodiment. The non-transfer treatment process of this embodiment is effected when portions of the transfer recording medium 41 other than an image-forming area pass through the recording section 43. This process is effected when both heat energy and light energy are applied to the transfer recording layer 41*b* by heating of the recording head 43*a* and lighting of both fluorescent tubes 43*c*, 43*d*. The transfer recording layer 41*b* which is provided with this treatment becomes non-transferrable since reaction of the high polymer progresses rapidly.

Figure 23:
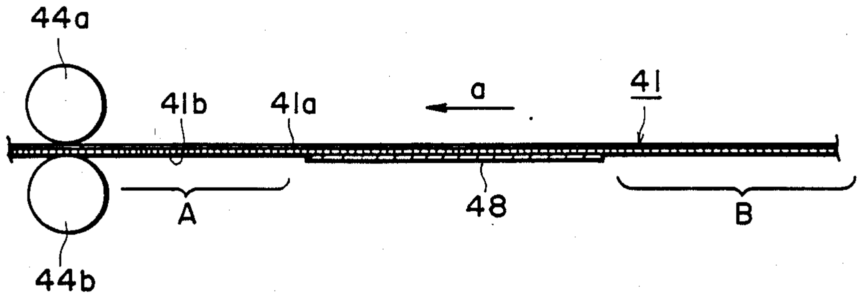
FIG. 23 is a diagram illustrating a state in which a sheet of recording paper is superposed on the transfer recording medium.

The aforementioned treatment process will be described by citing an example in which a sheet of the recording paper 48 is conveyed. When the image-forming area of the transfer recording medium 41, i.e., the portion of the transfer recording medium 41 superposed on the recording paper 48 as shown in FIG. 23, passes through the recording section, the transferred image-forming step is carried out. On the other hand, the non-transfer step is carried out when the portions of the transfer recording medium other than its image-forming area, i.e., the portion A downstream of the tip of the recording paper 48 in the advancing direction of the transfer recording medium 41 and the portion B upstream of the rear end of the recording paper 48 (i.e., portions where the recording paper is not superposed and the transfer recording layer 41*b* is exposed), pass through the recording section 43.

A more detailed description will now be made of the timing of the transferred image-forming process and the non-transfer treatment process in a case where a sheet of the recording paper 48 of the A4 size (297 mm) is conveyed to effect recording.

Figure 24:
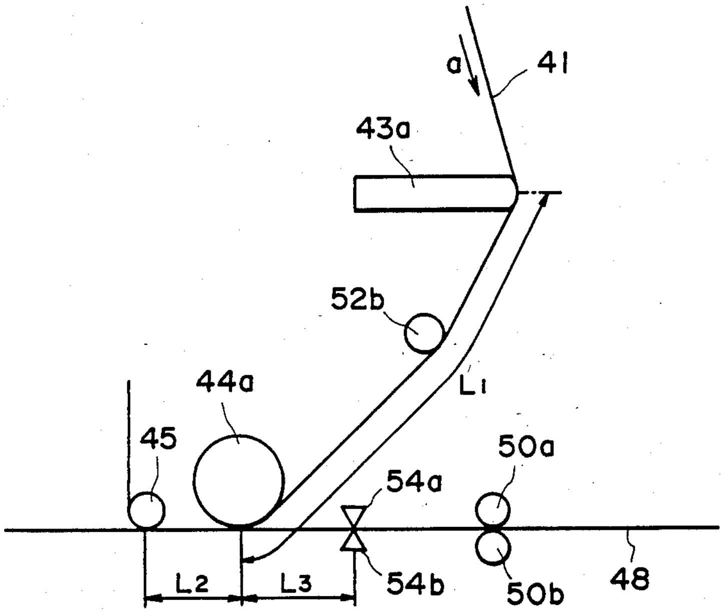
FIG. 24 is a diagram illustrating the distance of each member of the recording apparatus.

As shown in FIG. 24, assuming that the distance from the recording head 43*a* to the position of pressure contact between the transfer roller 44*a* and the pressure roller 44*b* is $L_1$, the distance from the position of pressure contact to the release roller 45 is $L_2$, and the distance from the position of pressure contact to registration sensors 54*a*, 54*b* is $L_3$. First, as shown in the timing chart shown in FIG. 25, when the start button is pressed, the feed motor $M_1$ is driven to feed the recording paper 48 and stops driving when the tip of the recording paper 48 is detected by registration sensors constituted by the light-emitting element 54*a* and the light-receiving element 54*b*. Simultaneously, the convey motor $M_2$ for rotating the transfer roller 44*a* is driven to convey the transfer recording medium 41 in the direction of the arrow a, and the transferred image-forming process is effected in the recording section 43 during the time $T_3$ (i.e., the duration of time during which the transfer recording medium 41 is conveyed the distance of 297 mm), thereby forming a transferred image corresponding to the length of the A4 size.

Subsequently, the recording section 43 begins the non-transfer process and stops after a lapse of the time $T_4$ during which the rear end of the transferred image is conveyed the distance of $L_1+L_2$ (here, by "stop" is meant that neither heat energy nor light energy is applied to the transfer recording medium 41).

Incidentally, after a lapse of the time $T_1$ during which the transfer recording medium 41 is conveyed the distance of $L_1$–$L_3$ from the start of conveyance, the feed motor is driven during the time $T_2$ (i.e., the duration of time during which the recording paper 48 is conveyed the distance of $L_3$), conveys the recording paper 48 at the same speed as that of the transfer recording medium 41, and then stops. Consequently, the tip of the recording paper 48 is aligned with the tip of the transferred image on the transfer recording medium 41 in the transfer section 44. The recording paper 48 is then conveyed by the rotation of the transfer roller 44*a*.

If the transfer recording medium 41 and the recording paper 48, for which the transferred image-forming process and the non-transfer treatment process have been provided using the recording head 43*a* and the light sources 43*c*, 43*d* of the recording section 43, are brought into pressure contact with each other in the transfer section 44, the transfer recording layer 41*b* in the transferred image-forming area is transferred onto the recording paper 48 in response to image information. Thus a transferred image of the two colors of magenta and blue is recorded on the recording paper 48. In addition, since the portions of the transfer recording layer 41*b* other than the transferred image-forming area have been treated to be non-transferrable, even if those portions come into direct contact with the pressure roller 44*b*, the transfer recording layer 41*b* is not adhered to the roller 44*b*.

Incidentally, the recording paper 48 on which the image has been transferred is released from the transfer recording medium 41 by means of the release roller 45, and is discharged onto a discharge tray 51 by means of a pair of discharge rollers 53*a*, 53*b*.

Thus, two-color recording is effected in one step without causing the transfer recording layer 41*b* to be adhered to the pressure roller 44*b* and the like.

As described above, since the present embodiment is arranged such that the portions of the transfer recording layer other than its transferred image-forming area are made non-transferrable, even if the transfer recording layer is brought into contact with a member of the transfer section and the like, the transfer recording layer is not adhered to such a member, thereby allowing a stain-free image to be recorded on the recording medium.

Figure 26A:
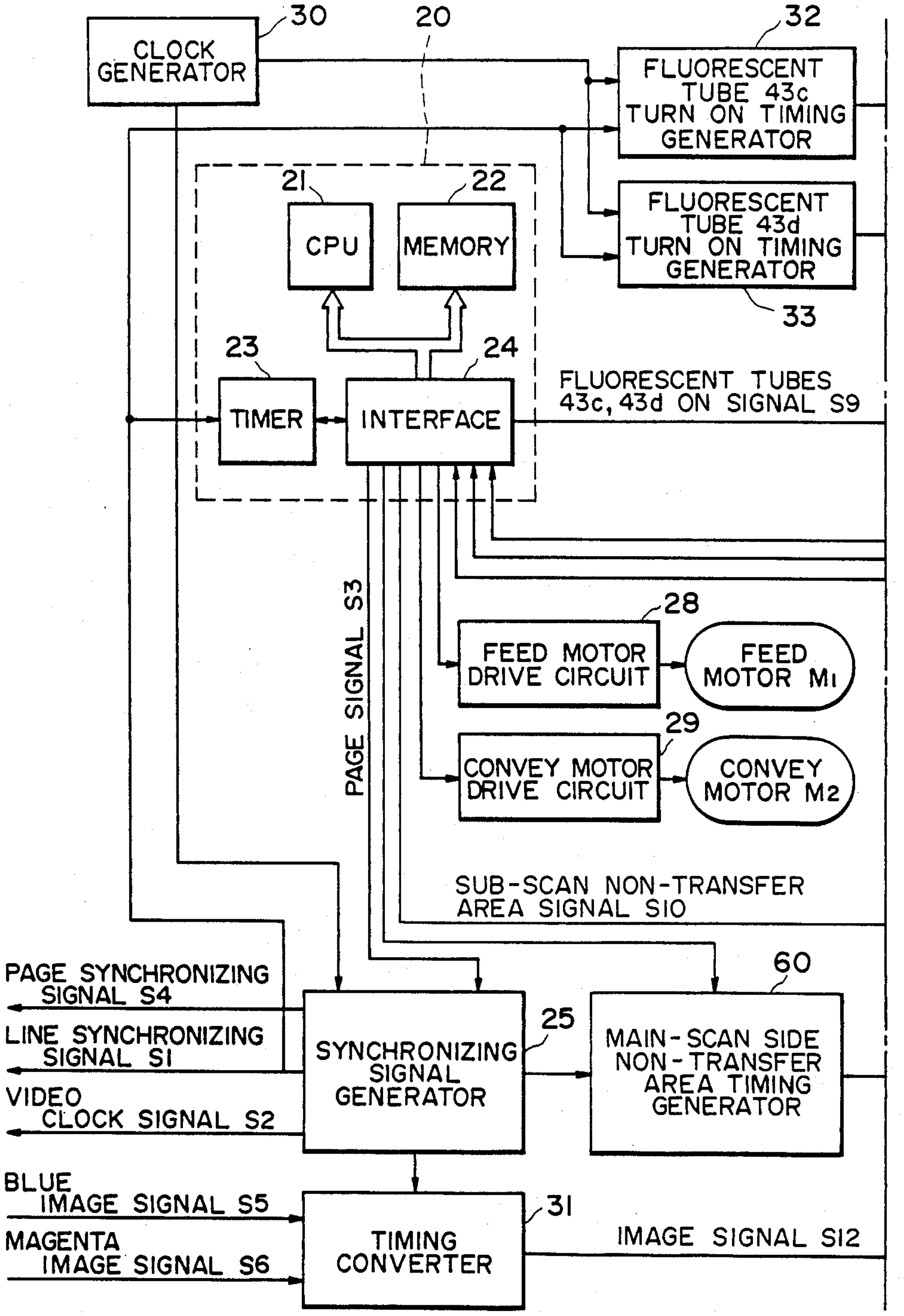
FIG. 26 composed of FIGS. 26A and 26B is a block diagram.
Figure 26B:
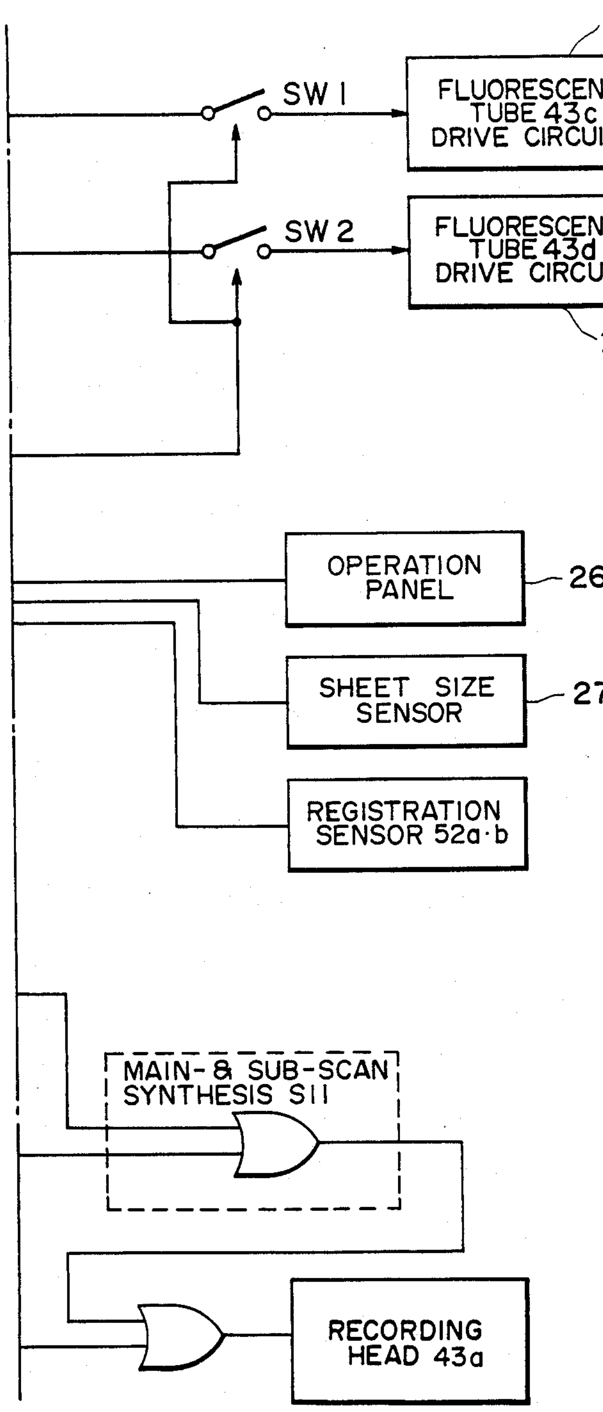
Figure 26:
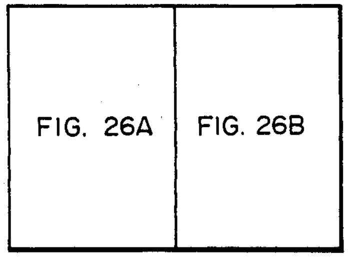
Figure 27:
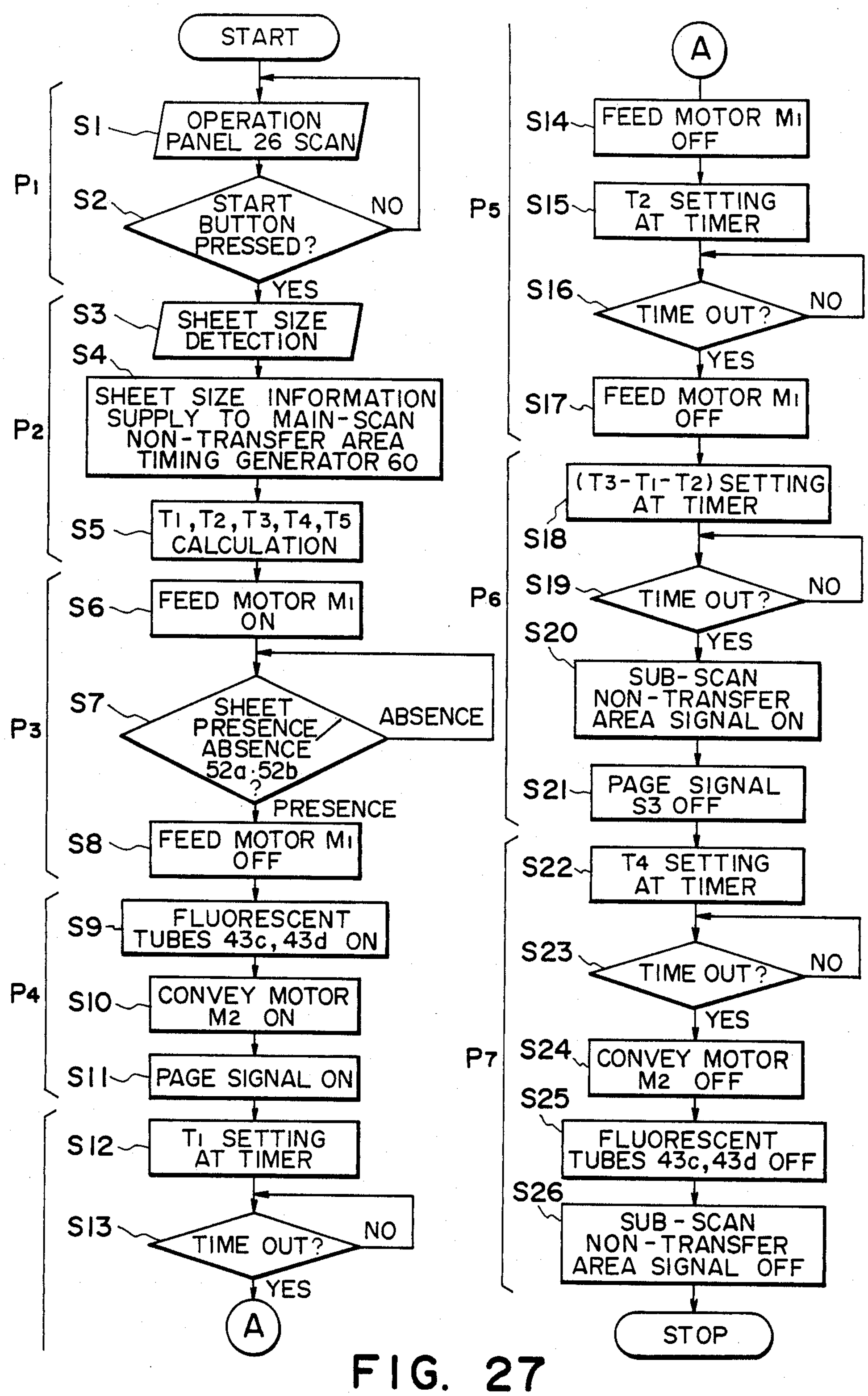
FIG. 27 is a flowchart.

FIGS. 26 and 27 illustrate a block diagram and a flowchart of the apparatus shown in the foregoing embodiment.

With respect to the block diagram shown in FIG. 26, points of difference with FIG. 9 will be described, and the description of FIG. 9 applies in a similar manner with respect to the other points. In the drawing, reference numeral 60 denotes a main-scan side non-transfer area timing generator. This generator 60 receives recording sheet size information from the CPU 21 via the interface 24 and generates a non-transfer area timing in the main scanning. For instance, in the apparatus using the recording head 43*a* of the A4 size, if the sheet size is B5, a portion other than the transferred image-forming area appears on the main scanning side, and the generator 60 generates that timing. A signal issued by this main-scanning side non-transfer area timing generator 60 is synthesized with a sub-scan non-transfer area signal S10 transmitted from the CPU 21 via the interface 24, and a non-transfer area signal S11 in which both main and sub scanning are synthesized is produced. When that signal Sll and an image signal S12 from a timing converter 31 are synthesized and the synthesized signal is transmitted to the recording head 43*a* as an image signal, the portion of the recording head 43*a* other than the transferred image-forming area is heated without fail.

Description will now be made of the flowchart shown in FIG. 27.

Figure 25:
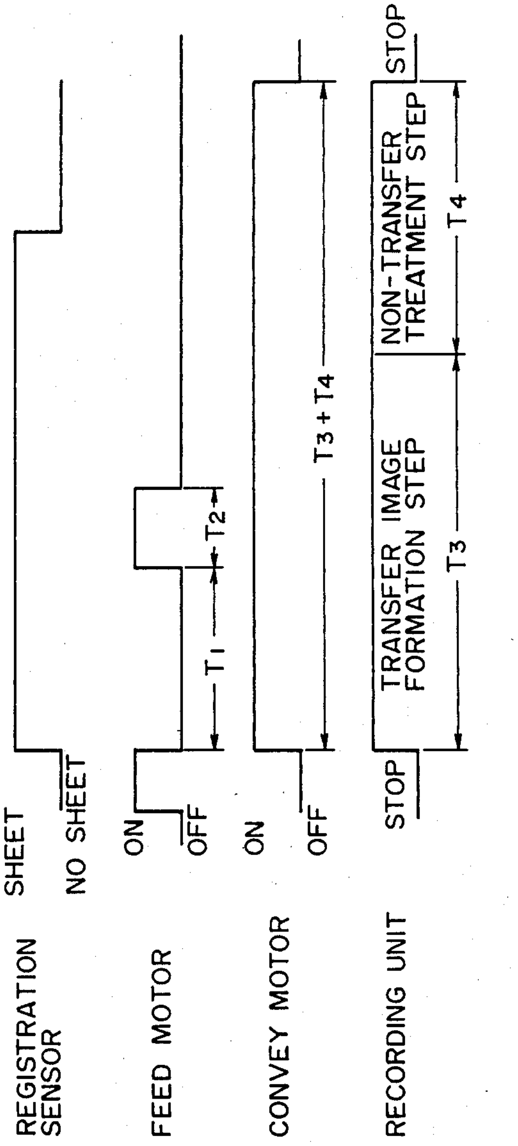
FIG. 25 is a timing flowchart illustrating the relationships among a transfer processing process, a non-transfer processing process, and the conveyance of recording paper.

First, in Phase $P_1$, the operation panel 26 is scanned, and whether or not the start button has been pressed is detected (Step S2). If the start button has not been pressed, Phase $P_1$ is repeated. If the start button has been pressed, the operation proceeds to Phase $P_2$, and the sheet size is detected (Step S3). That information is transmitted to the main-scan non-transfer area timing generator 60 (Step S4), and $T_1$, $T_2$, $T_3$, and $T_4$ in FIG. 25 are calculated (Step S5). Then, in Phase $P_3$, the feed motor $M_1$ is turned ON (Step S6), and the operation remains on standby until the recording paper 48 is fed to the registration sensors 52*a*, 52*b* (Step S7), and the feed motor $M_1$ is then turned OFF (step S8). Then, in Phase $P_4$, the transferred image-forming process is commenced, the fluorescent tubes 43*c*, 43*d* are turned ON (Step S9), and the convey motor $M_2$ is turned ON (Step S10). A page signal is sent to the synchronizing signal generator 25 (Step S11). In Phase $P_5$, $T_1$ is set (Step S12), and after the time is out (Step S13), the feed motor $M_1$ is turned ON Step S14), and the time $T_2$ is set (Step S15). After the time is out (Step S16), the feed motor $M_1$ is turned OFF (Step S17). Consequently, the recording paper 48 reaches the transfer roller 44*a*. In Phase $P_6$, the time $T_3$–$T_1$–$T_2$ is set (Step S18), and the operation remains on standby until the time is out (Step S19). In other words, the period of formation of a transferred image terminates after a lapse of the time $T_3$ from Phase $P_4$, and the page signal S3 is turned OFF (Steps S20–S21). Subsequently, in Phase $P_7$, the time $T_4$ is set (Step S22), and the operation remains on standby until the time is out (Step S23). In other words, when the terminating end of the transferred image-forming area reaches the release roller 45, the fluorescent tubes 43c, 43d and the convey motor $M_2$ are turned OFF, thereby completing the operation (Steps S24, S25, S26).

It should be noted that, in each of the foregoing embodiments, a fixing means for fixing on the recording medium an image which has been transferred in the transfer section may be provided, as necessary, downstream of the release roller in the advancing direction of the recording medium, thereby to fix the image.

As described above, the present invention provides a method of and an apparatus for image recording which is capable of preventing the transfer recording layer from becoming adhered to unnecessary portions.

What is claimed is:

1. An image recording apparatus for recording an image on a recording medium, comprising:
   a recording section employing a transfer recording medium having a transfer recording layer whose characteristics change upon application of a first energy and a second energy thereto, including first energy applying means for applying said first energy to said transfer recording medium, disposed along a conveying route of said transfer recording medium and second energy applying means for applying said second energy to said transfer recording medium;
   a transfer section for transferring onto said recording medium an image formed on said transfer recording medium in said recording section; and
   non-transfer means disposed upstream of said transfer section in the advancing direction of said transfer recording medium and adapted to make portions of said transfer recording layer other than an image-forming area non-transferable 2. An image recording apparatus for recording an image on a recording medium, comprising:
   a recording section employing a transfer recording medium having a transfer recording layer which is constituted by two or more kinds of image-forming elements each of which react to light of a predetermined wavelength and have physical properties governing transfer characteristics that change on application of light energy and heat energy thereto, said recording section disposed along a conveying route of said transfer recording medium and including heating means for applying heat energy to said transfer recording medium in correspondence with image information and irradiating means for applying light energy to said transfer recording medium;
   a transfer section for transferring onto said recording medium the image formed on said transfer recording medium in said recording section; and
   offset-preventing means disposed upstream of said transfer section in the advancing direction of said transfer recording medium and including heating means for applying heat energy to portions of said transfer recording layer other than its image-forming area and irradiating means for applying light energy having a wavelength to which said two or more kinds of said image-forming elements react.

3. An image recording apparatus for recording an image on a recording medium, comprising;
   a recording section employing a transfer recording medium having a transfer recording layer whose physical properties governing transfer characteristics change on application of light energy and heat energy thereto, disposed along a conveying route of said transfer recording medium which is conveyed and including heating means for applying heat energy to said transfer recording medium and irradiating means for applying light energy to said transfer recording medium;
   a transfer section for transferring onto said recording medium the image formed on said transfer recording medium in said recording section; and
   offset-preventing means disposed upstream of said transfer section in the advancing direction of said transfer recording medium and adapted to be capable of applying heat energy and light energy to portions of said transfer recording layer other than its image-forming area and capable of varying the width of a heating source in correspondence with the size of image formation.

4. A method of image recording comprising:
   conveying a transfer recording medium having a transfer recording layer whose transfer characteristics change on application of light energy and heat energy thereto;
   forming a transferred image by selectively applying heat energy to said transfer recording layer in a recording section in correspondence with image information and by imparting light energy thereto;
   applying both light energy and heat energy to portions of said transfer recording layer other than a transferred image-forming area; and
   bringing said transfer recording layer into close contact with said recording medium to transfer said transferred image onto said recording medium.

5. A recording apparatus according to claim 1, further comprising means for maintaining said transfer recording medium at a fixed angle relative to said first energy applying means.

6. A recording apparatus according to claim 1, wherein said first energy applying means is controlled in correspondence with image information.

7. A recording apparatus according to claim 1, wherein said first energy applying means is a thermal head.

8. A recording apparatus according to claim 1, wherein said second energy applying means is a light source.

9. A recording apparatus according to claim 1, wherein the change in said transfer characteristics is in respect of the softening temperature.

10. A recording apparatus according to claim 1, wherein said transfer recording medium is pressed against said first energy applying means by means of tension.

11. A recording apparatus according to claim 1, wherein said transfer section uses heat and pressure to transfer onto the recording medium the image formed on said transfer recording medium.

12. A recording apparatus according to claim 1, wherein said non-transfer means uses said first and second energies to make said portions of the transfer recording layer non-transferrable.

13. A recording apparatus according to claim 1, wherein both said first and second energy applying means are controlled in correspondence with image signal information.

14. A recording apparatus according to claim 1, wherein said transfer section and said non-transfer means use the same heat source.

15. A recording apparatus according to claim 2, wherein said transfer section uses heat and pressure to transfer onto the recording medium the image formed on said transfer recording medium.

16. A recording apparatus according to claim 2, wherein the irradiating means of said offset-preventing means is controlled in correspondence with conveyance of the said transfer recording medium.

17. A recording apparatus according to claim 3, wherein said heating means is controlled in correspondence with the image to be formed.

18. A recording apparatus according to claim 3, further comprising means for maintaining said transfer recording medium at a fixed angle relative to said heating means.

19. A recording apparatus according to claim 3, wherein said transfer recording medium is biased against said heating means.

20. A recording apparatus according to claim 3, wherein said transfer section uses heat and pressure to transfer onto the recording medium the image formed on said transfer recording medium.

21. A recording apparatus according to claim 3, wherein said recording section and said offset-preventing means use the same light source.

22. A recording apparatus according to claim 3, wherein said offset -preventing means is disposed upstream of said recording section in the advancing direction of said transfer recording medium.

23. A method of image recording according to claim 4, wherein both said light and heat energies are applied to the portions of the transfer recording layer other than a transfered image-forming area in said recording section.

24. A method of image recording according to claim 4, further comprising the step of releasing said recording medium from said transfer recording medium using a release roller.

25. A method of image recording according to claim 24, further comprising the step of fixing an image which has been transferred onto said recording medium downstream of said release roller.

26. An image recording apparatus, comprising:

a conveying means for conveying a transfer recording medium, along a conveyance path, the transfer recording medium having a transfer recording layer with transfer characteristics which vary upon application of one or more kinds of energy;

an image forming section provided along the conveyance path so as to apply at least one of said energies to said transfer recording medium and form an image on a part thereof;

a visible image forming section for forming a visible image on a recording medium in accordance with the image formed on said transfer recording medium; and means provided downstream of said visible image forming section for causing the transfer characteristics of said transfer recording layer, other than said part thereof having an image, to be non-transferable.

27. An image recording apparatus according to claim 26, wherein said transfer recording medium and said recording medium are applied with thermal energy while in contact with each other at said visible image forming section.

28. An image recording apparatus according to claim 26, wherein said transfer recording medium and said recording medium are pressed together at said visible image forming section.

29. An image recording apparatus according to claim 26, wherein said one or more kinds of energy includes optical energy.

30. An image recording apparatus according to claim 26, wherein said one or more kinds of energy includes thermal energy.

31. An image recording apparatus according to claim 26, wherein at least one of said one or more kinds of energy is controlled in response to image information.

32. An image recording apparatus for recording an image on a recording medium comprising:

a mounting portion for removably mounting a transfer recording medium having a transfer recording layer whose transfer characteristics change upon application of a first energy and a second energy thereto;

a first energy applying means for applying said first energy to said transfer recording medium disposed along a transport path of said transfer recording medium mounted on said mounting portion;

a recording section for applying said second energy to said transfer recording medium;

a transfer section for transferring an image formed on said recording medium at said recording section; and non-transfer means disposed upstream of said transfer section in the advancing direction of said transfer recording medium along said transport path and adapted to make portions of said transfer recording layer other than an image-forming area non-transferable.

* * * * *

UNITED STATES PATENT AND TRADEMARK OFFICE
CERTIFICATE OF CORRECTION

PATENT NO. : 4,887,095

DATED : December 12, 1989

INVENTOR(S) : MASAFUMI WATAYA, ET AL.

It is certified that error appears in the above-identified patent and that said Letters Patent is hereby corrected as shown below:

COLUMN 1

Line 35, "recording paper" should read --recording--.

COLUMN 3

Line 9, "according medium;" should read --recording medium;--.

COLUMN 5

Line 9, "transfer 5a" should read --transfer roller 5a--.

COLUMN 6

Line 67, "rom" should read --from--.

COLUMN 7

Line 7, "which" should read --which is--.
Line 15, "Curve B" should read --Curve B,--.
Line 49, "a 800" should read --an 800--.

UNITED STATES PATENT AND TRADEMARK OFFICE
CERTIFICATE OF CORRECTION

PATENT NO. : 4,887,095

DATED : December 12, 1989

INVENTOR(S) : MASAFUMI WATAYA, ET AL.

It is certified that error appears in the above-identified patent and that said Letters Patent is hereby corrected as shown below:

COLUMN 8

Line 38, Close up right margin.
Line 39, Close up left margin.
Line 52, "above as" should read --above is--.
Line 68, "by cut sheets" should be deleted.

COLUMN 9

Line 30, "time T" should read --time $T_3$--.
Line 37, "distance of L." should read --distance of $L_1$.--.
Line 44, "time T5" should read --time $T_5$--.
Line 55, "in" should read --on--.

COLUMN 10

Line 2, "black-" should read --blue--.
Line 8, "Subsequently" should read --Subsequently,--.
Line 37, "convey motor M2" should read --convey motor $M_2$.--.

COLUMN 11

Line 8, "P" should read --$P_1$--.
Line 9, "Phase P2," should read --Phase $P_2$,--.
Line 12, "Phase $P_1$, the feed motor M" should read --Phase $P_3$, the feed motor $M_1$--.
Line 50, "imageforming" should read --image-forming--.

UNITED STATES PATENT AND TRADEMARK OFFICE

CERTIFICATE OF CORRECTION

PATENT NO. : 4,887,095

DATED : December 12, 1989

INVENTOR(S) : MASAFUMI WATAYA, ET AL.

It is certified that error appears in the above-identified patent and that said Letters Patent is hereby corrected as shown below:

COLUMN 12

Line 59, "recording layers 1b." should read --recording layer 1b.--.

COLUMN 16

Line 48, "pressurizia-" should read --pressuriza- --.
Line 65, "offset;" should read --offset,--.

COLUMN 18

Line 16, "an" should read --a--.
Line 21, "positions" should read --portions--.
Line 40, "A3 size" should read --A3 size,--.
TABLE 5, "15a-7 15a-8 15a-9" should read --53a-7 53a-8 53a-9--.

COLUMN 19

TABLE 5-continued, "15a-7 15a-8 15a-9" should read --53a-7 53a-8 53a-9--.
Line 17, "portion" should read --portions--.
Line 36, "shot." should read --step.--.

COLUMN 20

Line 26, "Phase P5," should read --Phase $P_5$,--.

UNITED STATES PATENT AND TRADEMARK OFFICE

CERTIFICATE OF CORRECTION

PATENT NO. : 4,887,095

DATED : December 12, 1989

INVENTOR(S) : MASAFUMI WATAYA, ET AL.

It is certified that error appears in the above-identified patent and that said Letters Patent is hereby corrected as shown below:

COLUMN 21

Line 56, "PvA" should read --PVA--.

COLUMN 24

Line 61, "ON Step S14)," should read --ON (Step S14),--.

COLUMN 25

Line 39, "non-transferable" should read --non-transferable.--.

COLUMN 27

Line 30, "offset -preventing" should read --offset-preventing--.
Line 36, "transfered" should read --transferred--.

UNITED STATES PATENT AND TRADEMARK OFFICE
CERTIFICATE OF CORRECTION

PATENT NO. : 4,887,095

DATED : December 12, 1989

INVENTOR(S) : MASAFUMI WATAYA, ET AL.

It is certified that error appears in the above-identified patent and that said Letters Patent is hereby corrected as shown below:

COLUMN 28

Line 31, "medium" should read --medium,--.

Signed and Sealed this

Twenty-fifth Day of June, 1991

Attest:

HARRY F. MANBECK, JR.

*Attesting Officer*

*Commissioner of Patents and Trademarks*